US008523546B2

(12) United States Patent
Shkolnik et al.

(10) Patent No.: US 8,523,546 B2
(45) Date of Patent: Sep. 3, 2013

(54) CYCLOID ROTOR ENGINE

(75) Inventors: Nikolay Shkolnik, West Hartford, CT (US); Alexander C. Shkolnik, Cambridge, MA (US)

(73) Assignee: LiquidPiston, Inc., Bloomfield, CT (US)

( * ) Notice: Subject to any disclaimer, the term of this patent is extended or adjusted under 35 U.S.C. 154(b) by 0 days.

(21) Appl. No.: 13/551,032

(22) Filed: Jul. 17, 2012

(65) Prior Publication Data
US 2012/0294747 A1    Nov. 22, 2012

Related U.S. Application Data

(63) Continuation of application No. 13/434,827, filed on Mar. 29, 2012, now abandoned.

(60) Provisional application No. 61/469,009, filed on Mar. 29, 2011.

(51) Int. Cl.
*F03C 2/00* (2006.01)
*F04C 2/00* (2006.01)

(52) U.S. Cl.
USPC ........... 418/61.2; 418/132; 418/140; 418/188

(58) Field of Classification Search
USPC .................. 418/61.2, 91, 131–132, 140, 144, 418/186–188; 123/241
See application file for complete search history.

(56) References Cited

U.S. PATENT DOCUMENTS

| 748,348 A | 12/1903 | Cooley |
| 813,018 A | 2/1906 | Okun |
| 1,144,921 A | 6/1915 | Stever |
| 1,225,056 A | 5/1917 | Riggs et al. |
| 1,406,140 A | 2/1922 | Anderson |
| 2,091,411 A | 8/1937 | Mallory |
| 2,344,496 A | 3/1944 | Conradt |
| 2,762,346 A | 9/1956 | White |
| 3,010,440 A | 11/1961 | Roth |

(Continued)

FOREIGN PATENT DOCUMENTS

| AU | 199897511 | 5/1999 |
| DE | 24 38 410 | 2/1976 |

(Continued)

OTHER PUBLICATIONS

Veselovsky, Veselovsky Rotary-Piston Engine, published at http://www.econologie.info/share/partager2/1296649576M5q2Sb.pdf Jan. 2, 2011.

(Continued)

*Primary Examiner* — Theresa Trieu
(74) *Attorney, Agent, or Firm* — Sunstein Kann Murphy & Timbers LLP

(57) ABSTRACT

A rotary engine has a cycloid rotor and a sealing grid including a face seal that rotates with the rotor, and including other seals that do not rotate with the rotor. As the rotor rotates within a housing, the rotor, housing and seal grid form at least one working chamber between them, the chamber undergoing a change from initial volume V1 to V2, which is less than V1, thus compressing a working medium, and subsequently expanding to volume V3, which may be larger than V1, such that the chamber volume is a smooth and continuous function of rotor's rotational angle.

17 Claims, 30 Drawing Sheets

(56) References Cited

U.S. PATENT DOCUMENTS

| | | | |
|---|---|---|---|
| 3,064,880 A | 11/1962 | Wankel et al. | |
| 3,102,682 A * | 9/1963 | Paschke | 418/61.2 |
| 3,206,109 A * | 9/1965 | Paschke | 418/61.2 |
| 3,244,157 A | 4/1966 | Tanferna et al. | |
| 3,315,648 A | 4/1967 | Del Castillo | |
| 3,316,887 A | 5/1967 | Melvin | |
| 3,408,991 A | 11/1968 | Davis | |
| 3,422,801 A | 1/1969 | Mido | |
| 3,452,723 A * | 7/1969 | Keylwert | 418/186 |
| 3,595,014 A | 7/1971 | McMaster | |
| 3,687,117 A | 8/1972 | Panariti | |
| 3,692,002 A | 9/1972 | Williams | |
| 3,754,534 A * | 8/1973 | Burley | 123/211 |
| 3,769,788 A | 11/1973 | Korper, III | |
| 3,797,464 A | 3/1974 | Abbey | |
| 3,809,024 A | 5/1974 | Abbey | |
| 3,815,555 A | 6/1974 | Tubeuf | |
| 3,844,117 A | 10/1974 | Ryan | |
| 3,845,745 A | 11/1974 | Dunlap et al. | |
| 3,872,838 A * | 3/1975 | Vogelsang et al. | 418/186 |
| 3,985,476 A * | 10/1976 | Hofbauer | 418/61.3 |
| 3,989,011 A | 11/1976 | Takahashi | |
| 3,998,049 A | 12/1976 | McKinley et al. | |
| 4,047,856 A | 9/1977 | Hoffman | |
| 4,059,068 A | 11/1977 | Guillermin et al. | |
| 4,083,446 A | 4/1978 | Schuchman, Sr. | |
| 4,083,663 A | 4/1978 | Montalvo | |
| 4,297,090 A | 10/1981 | Hoffmann | |
| 4,401,070 A | 8/1983 | McCann | |
| 4,446,829 A | 5/1984 | Yeager | |
| 4,553,513 A | 11/1985 | Miles et al. | |
| 5,072,589 A | 12/1991 | Schmitz | |
| 5,127,369 A | 7/1992 | Goldshtik | |
| 5,228,414 A | 7/1993 | Crawford | |
| 5,373,819 A | 12/1994 | Linder | |
| 5,622,149 A | 4/1997 | Wittry | |
| 5,623,894 A | 4/1997 | Clarke | |
| 5,647,308 A | 7/1997 | Biagini | |
| 5,755,197 A | 5/1998 | Oplt | |
| 5,799,636 A | 9/1998 | Fish | |
| 5,950,579 A | 9/1999 | Ott | |
| 5,992,356 A | 11/1999 | Howell-Smith | |
| 6,058,901 A | 5/2000 | Lee | |
| 6,112,522 A | 9/2000 | Wright | |
| 6,202,416 B1 | 3/2001 | Gray, Jr. | |
| 6,230,671 B1 | 5/2001 | Achterberg | |
| 6,318,309 B1 | 11/2001 | Burrahm et al. | |
| 6,397,579 B1 | 6/2002 | Negre | |
| 6,609,371 B2 | 8/2003 | Scuderi | |
| 6,668,769 B1 | 12/2003 | Palazzolo | |
| 6,722,127 B2 | 4/2004 | Scuderi et al. | |
| 6,752,104 B2 | 6/2004 | Fiveland et al. | |
| 6,752,133 B2 | 6/2004 | Arnell | |
| 6,955,153 B1 | 10/2005 | Peitzke et al. | |
| 7,117,839 B2 | 10/2006 | Horstin | |
| 7,191,738 B2 | 3/2007 | Shkolnik | |
| 7,520,738 B2 * | 4/2009 | Katz | 418/61.2 |
| 7,757,658 B2 | 7/2010 | Nagata et al. | |
| 7,909,013 B2 | 3/2011 | Shkolnik et al. | |
| 2002/0007813 A1 | 1/2002 | Shigemori | |
| 2005/0166869 A1 | 8/2005 | Shkolnik | |
| 2008/0202486 A1 | 8/2008 | Shkolnik et al. | |
| 2011/0023814 A1 | 2/2011 | Shkolnik et al. | |

FOREIGN PATENT DOCUMENTS

| | | |
|---|---|---|
| DE | 3705313 | 10/1987 |
| DE | 41 40 316 | 6/1993 |
| DE | 44 32 688 | 3/1995 |
| EP | 0345055 | 12/1989 |
| FR | 1 153 857 | 3/1958 |
| GB | 1 313 842 | 4/1973 |
| GB | 2 402 974 | 12/2004 |
| JP | 59-079002 | 5/1984 |
| JP | 3-501638 | 4/1991 |
| JP | 06-323159 | 11/1994 |
| JP | 8-100668 | 4/1996 |
| JP | 9-502780 | 3/1997 |
| JP | 2000-130101 | 5/2000 |
| JP | 2001-521094 | 11/2001 |
| RU | 2078221 | 4/1997 |
| WO | WO 90/02259 | 3/1990 |
| WO | WO 95/08055 | 3/1995 |
| WO | WO 98/10172 | 3/1998 |
| WO | WO 00/22286 | 4/2000 |
| WO | WO 03/074840 | 9/2003 |
| WO | WO 2005/071230 | 8/2005 |

OTHER PUBLICATIONS

International Searching Authority, Invitation to Pay Additional Fees with results of partial international search, 6 pages, Jun. 6, 2013.

* cited by examiner

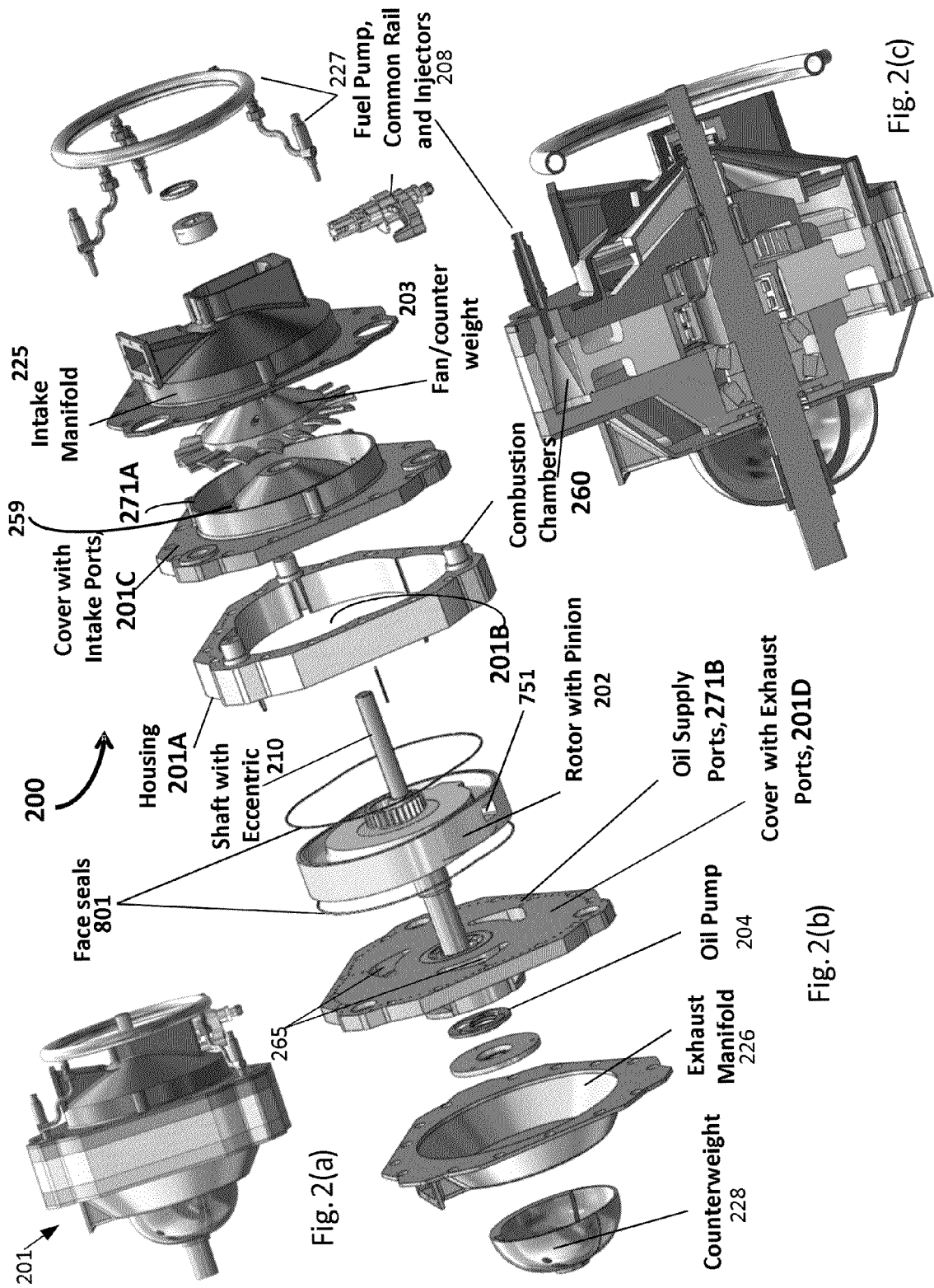

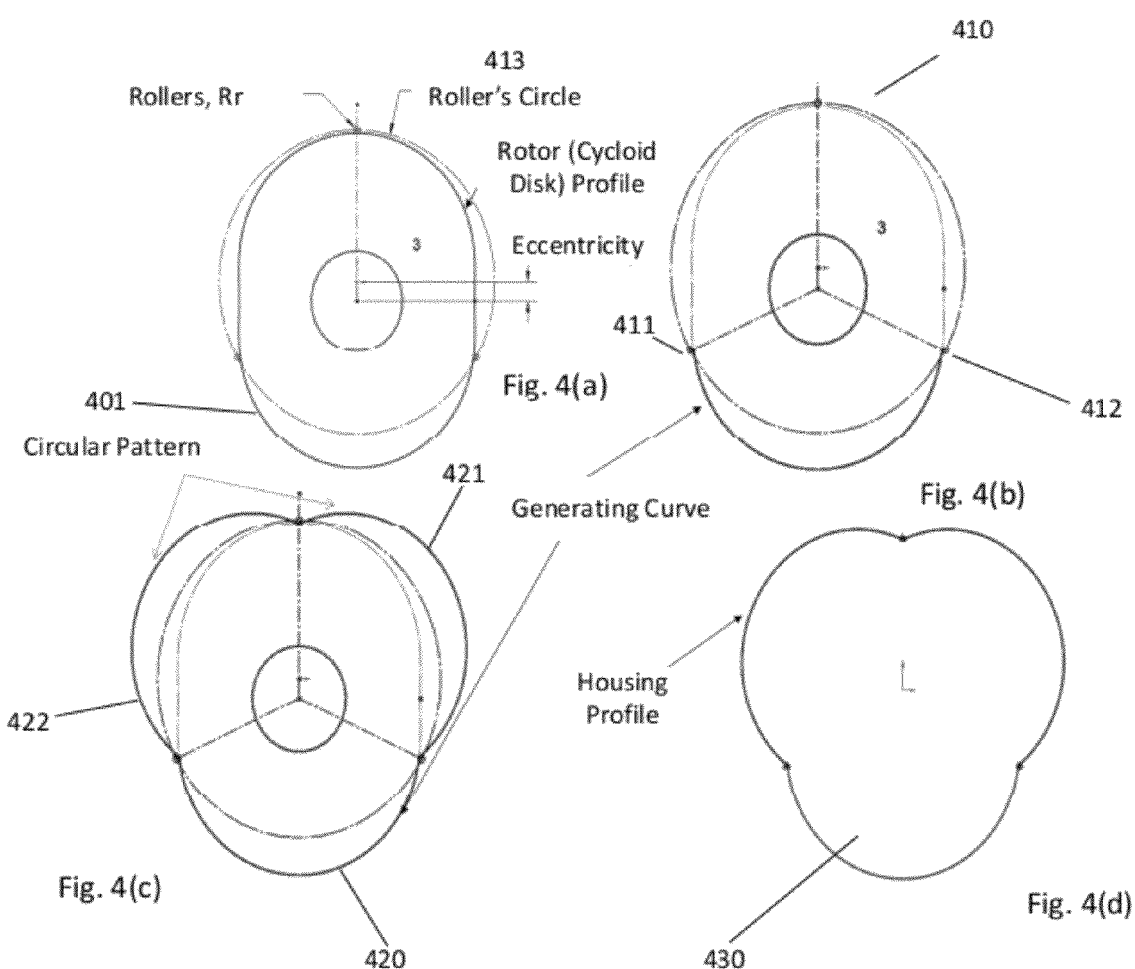

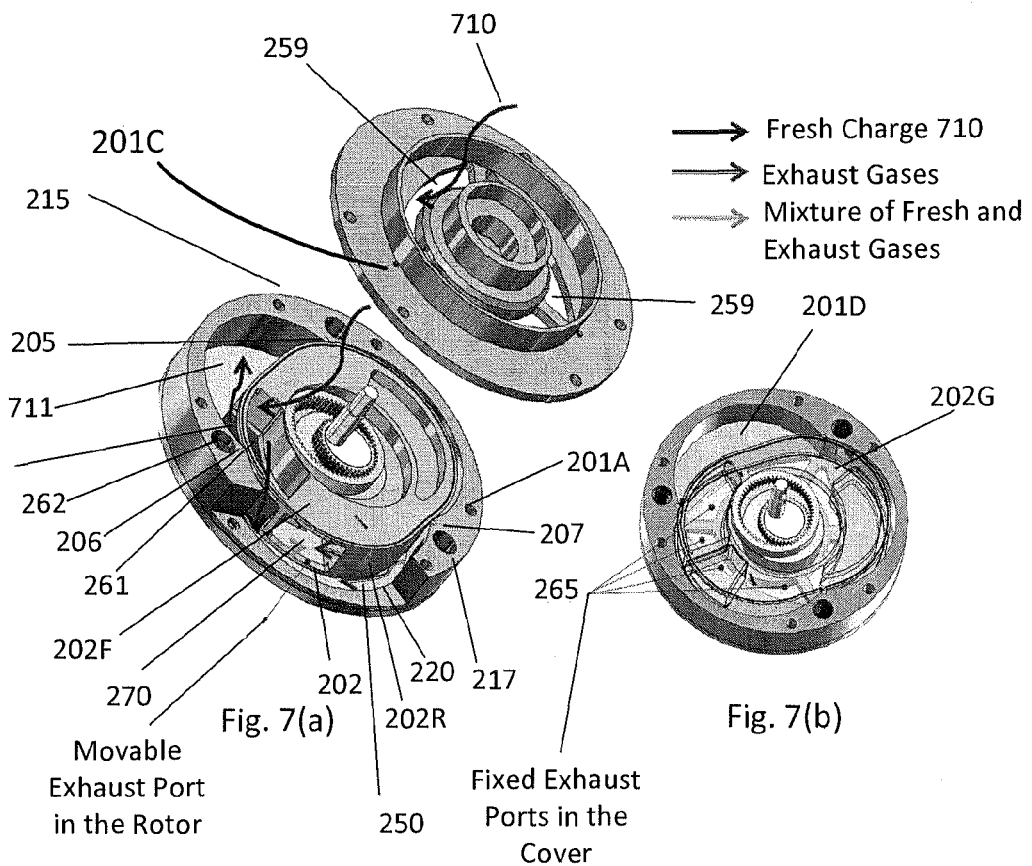
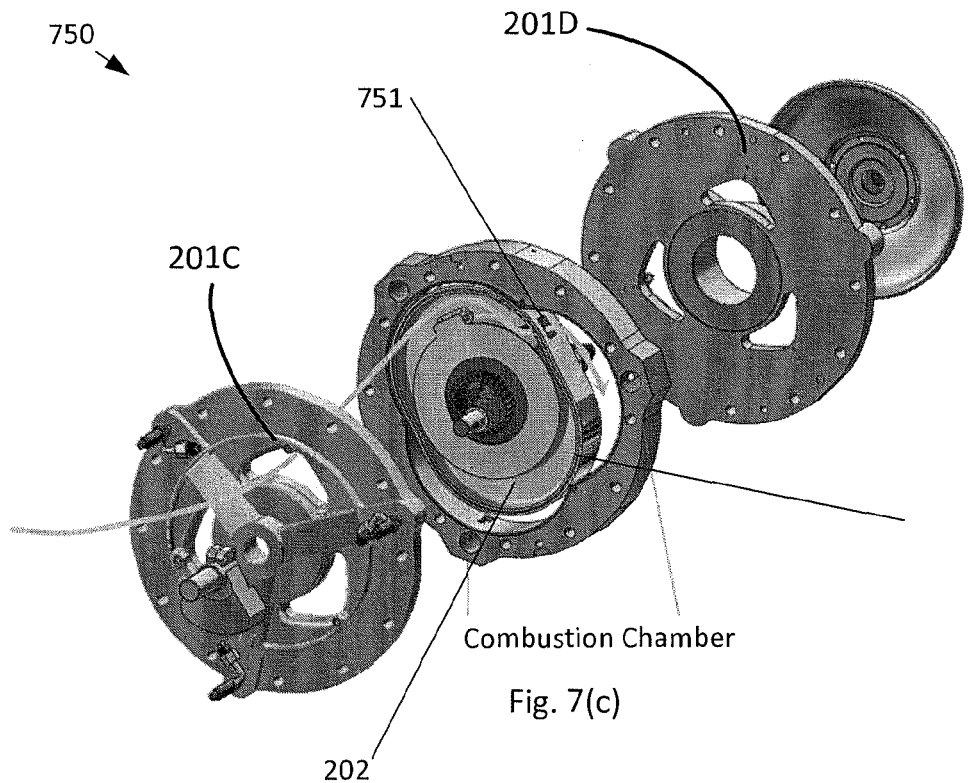

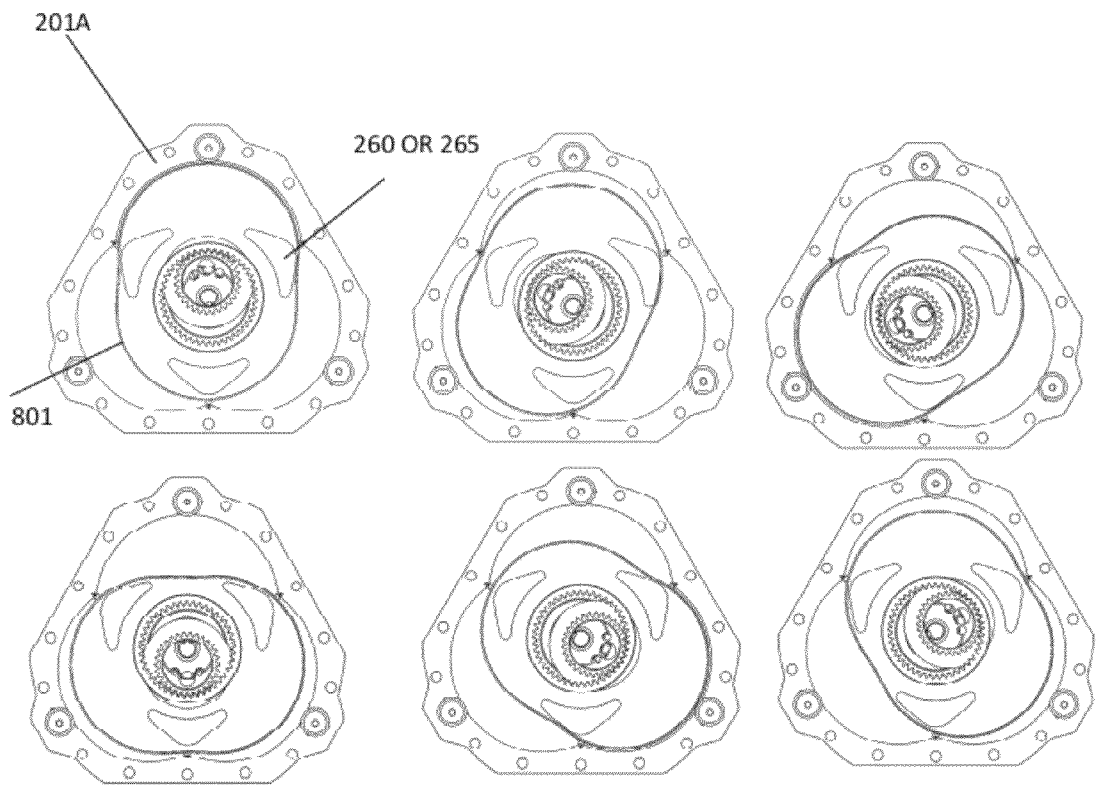
Fig. 9
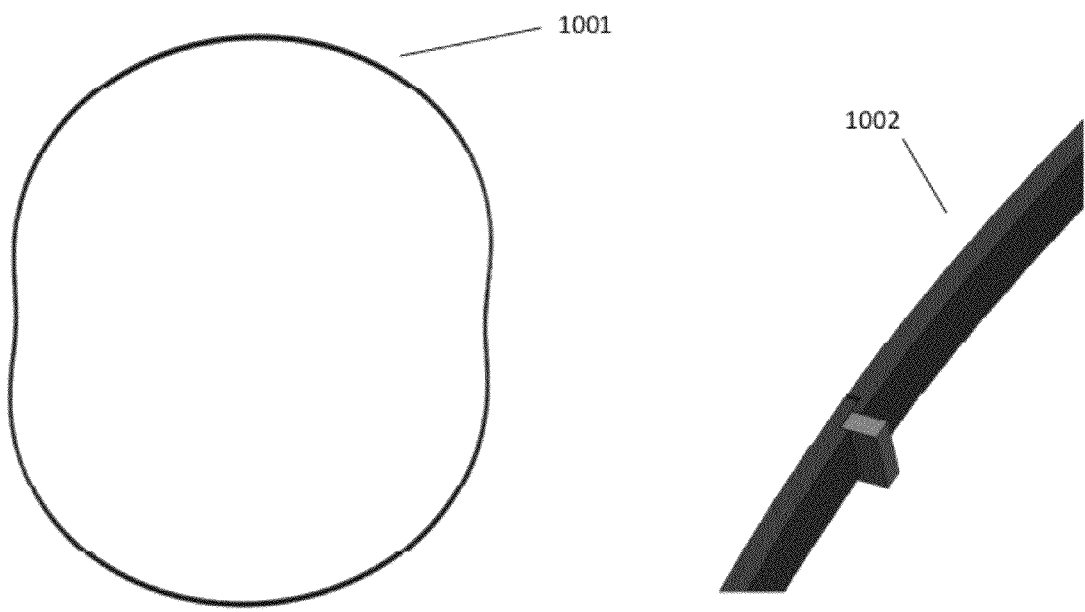
Fig. 10(a)
Fig. 10(b)

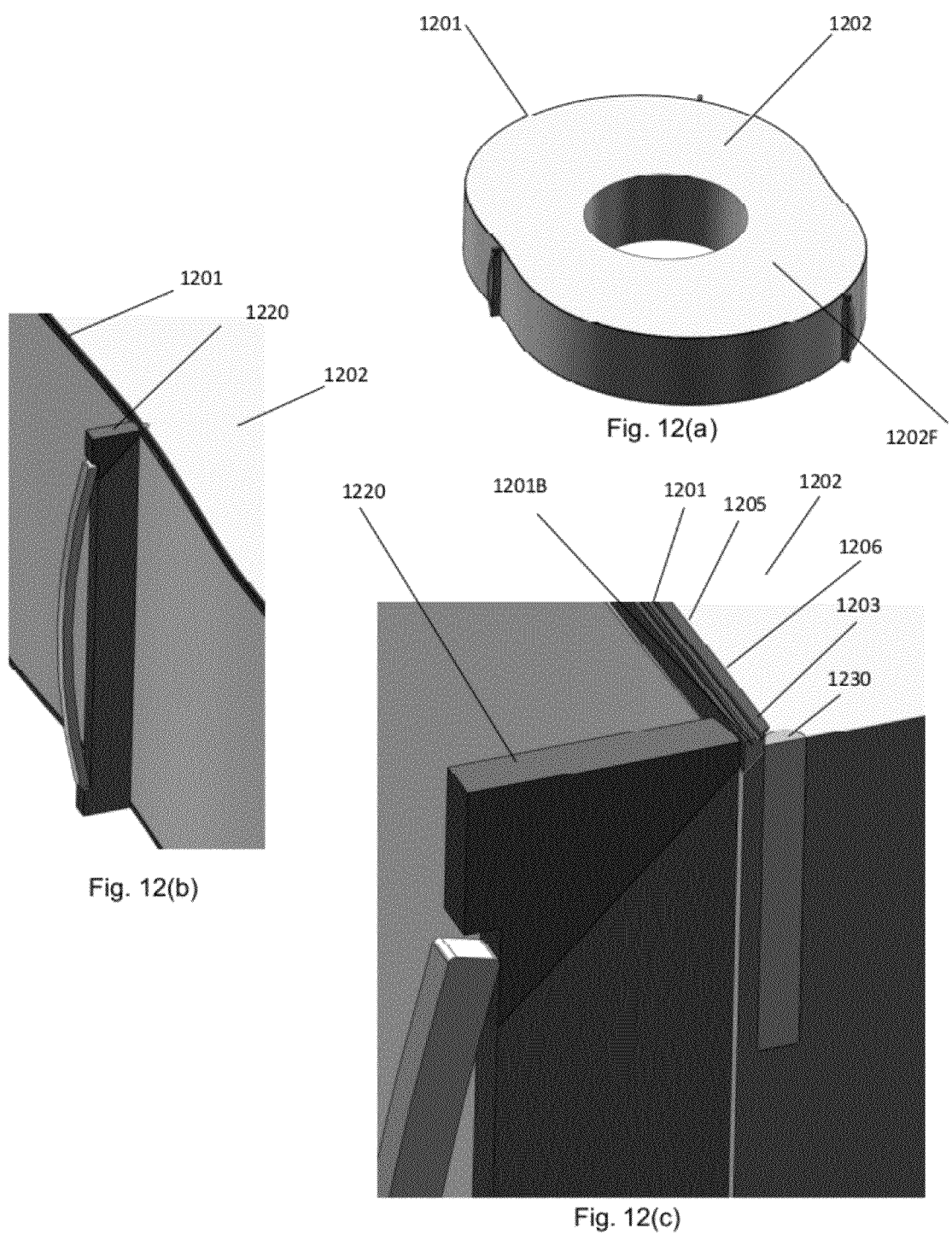

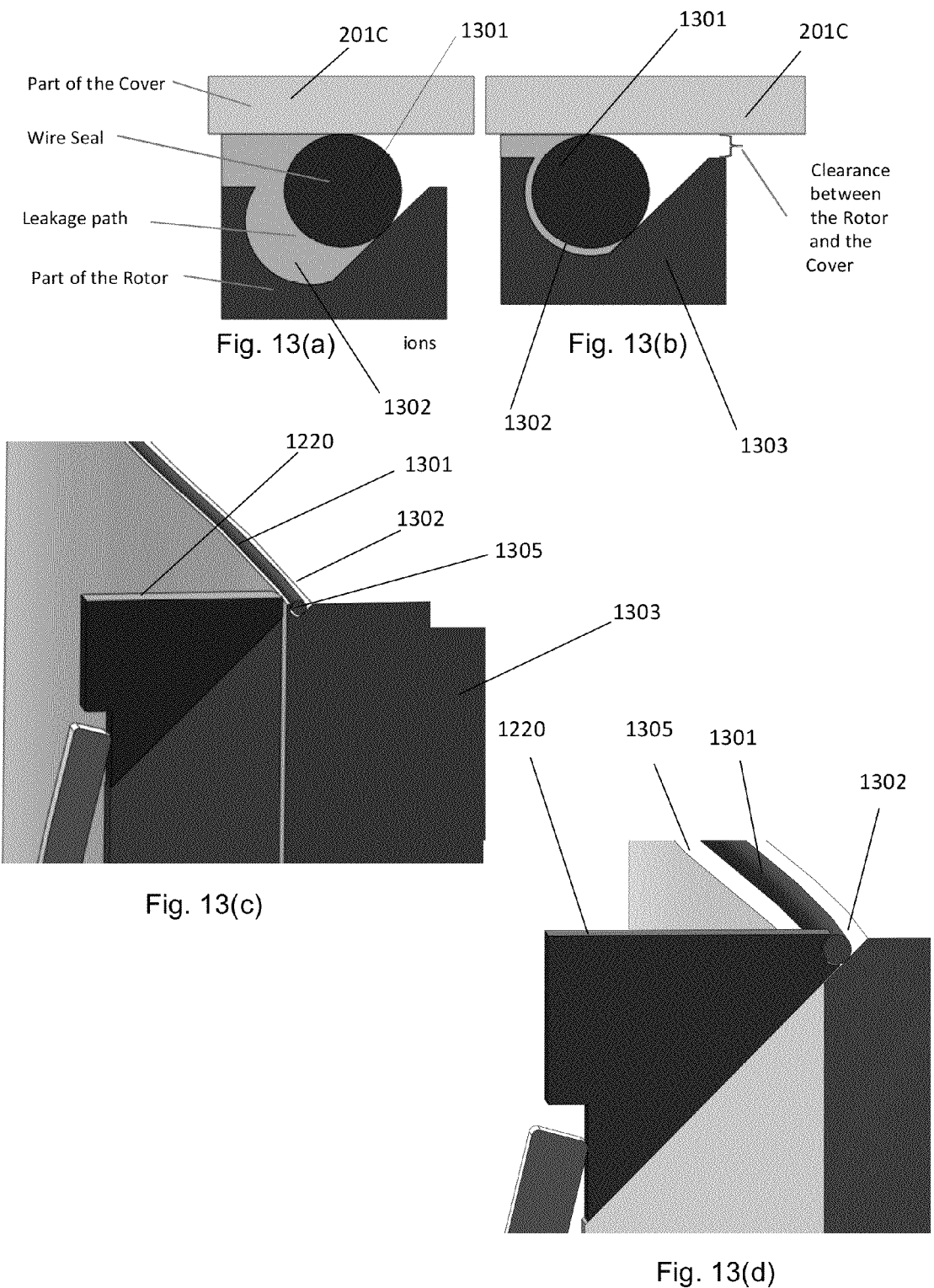

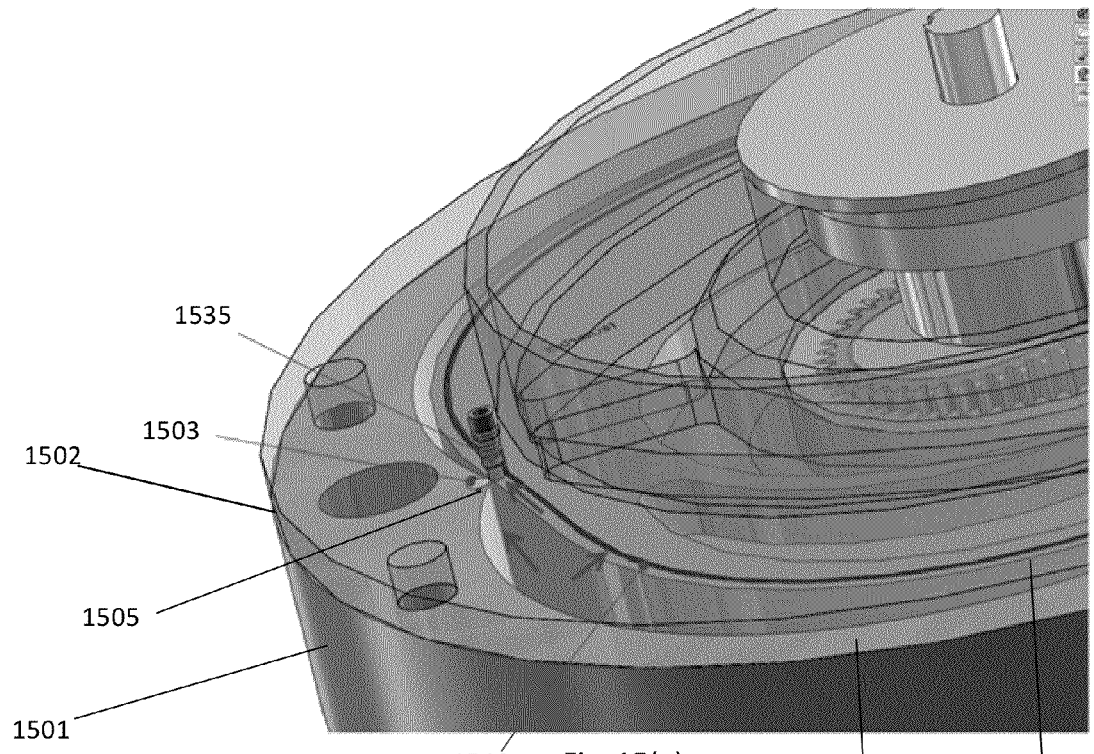
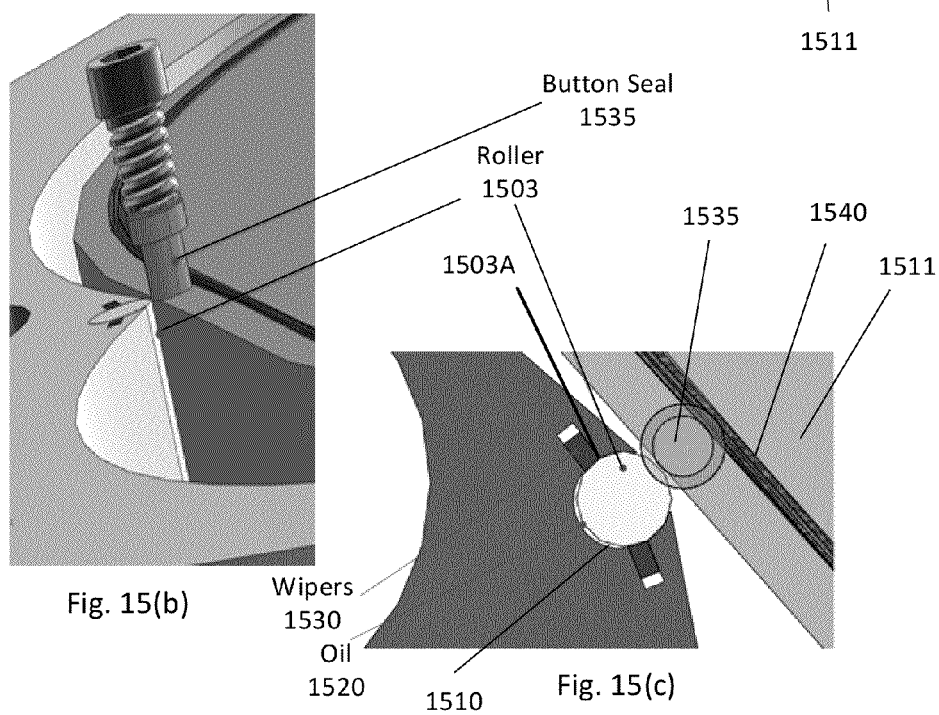

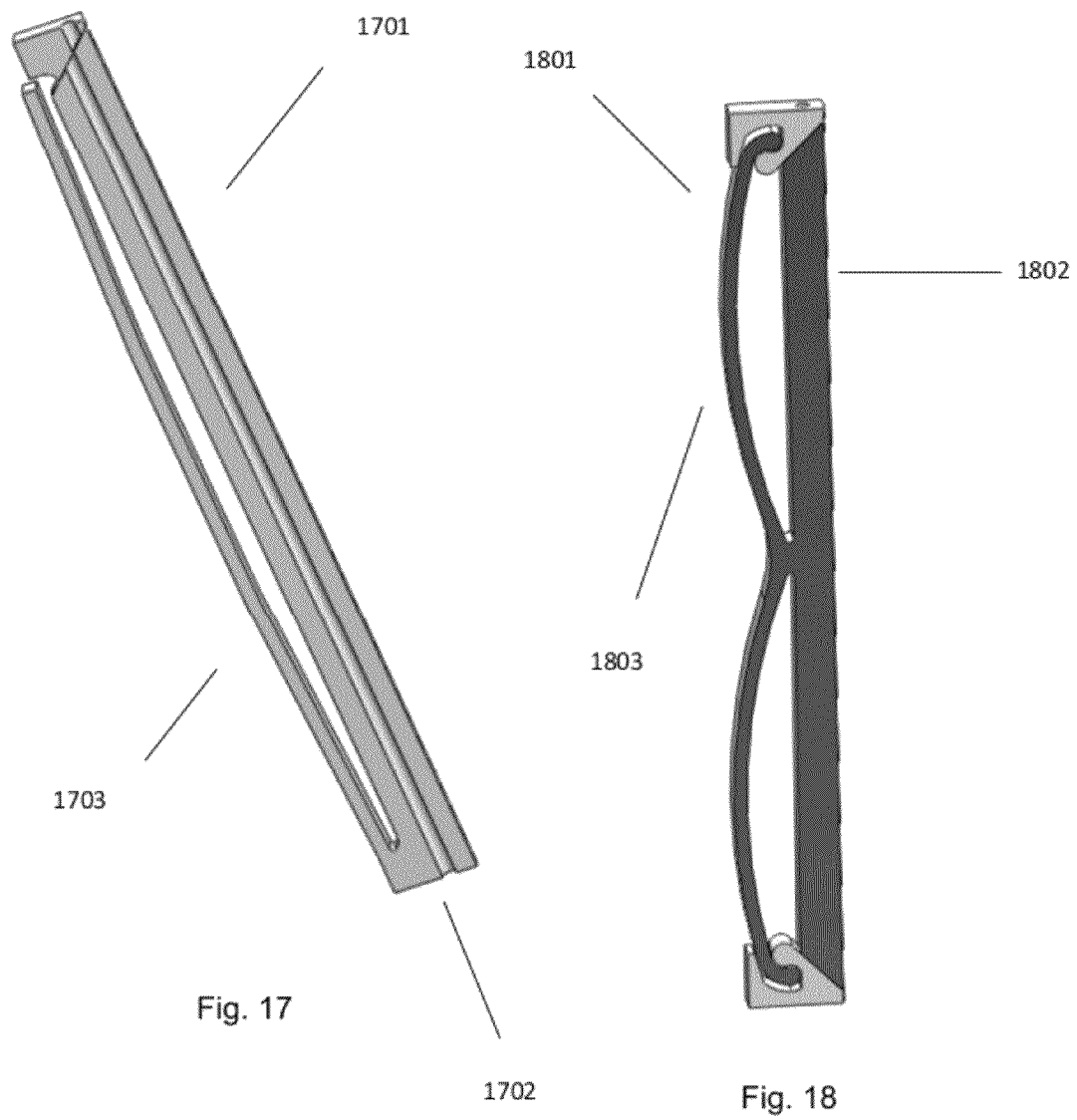

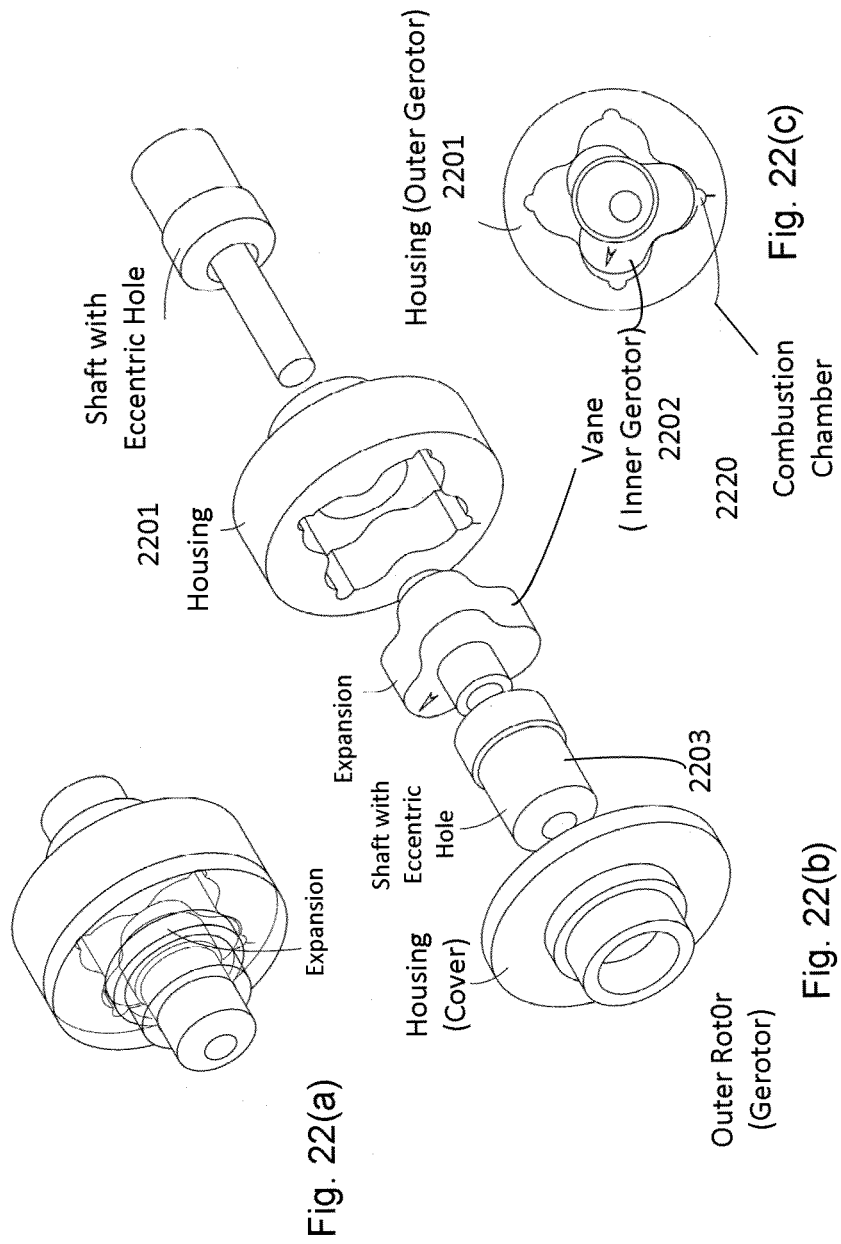

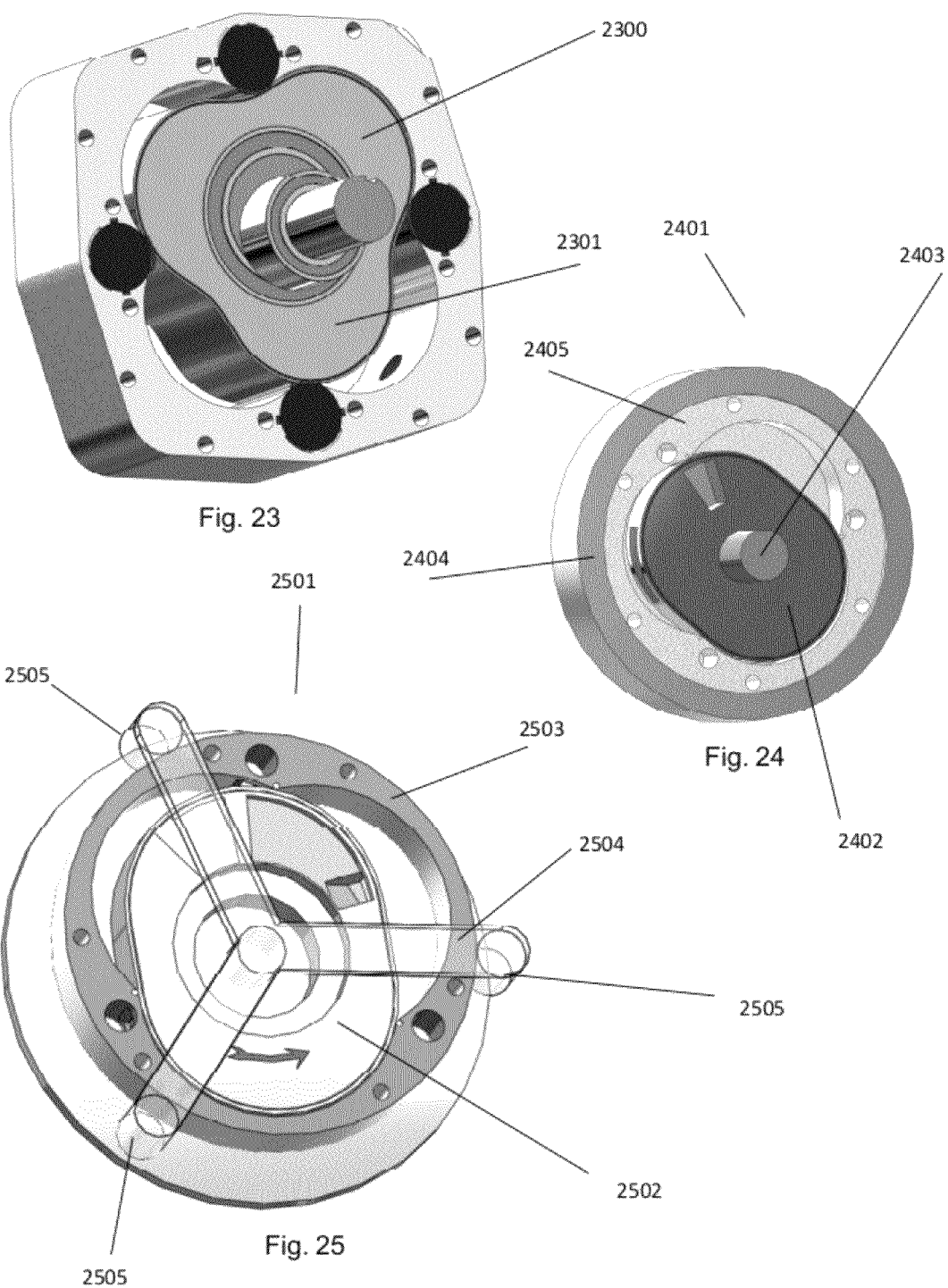

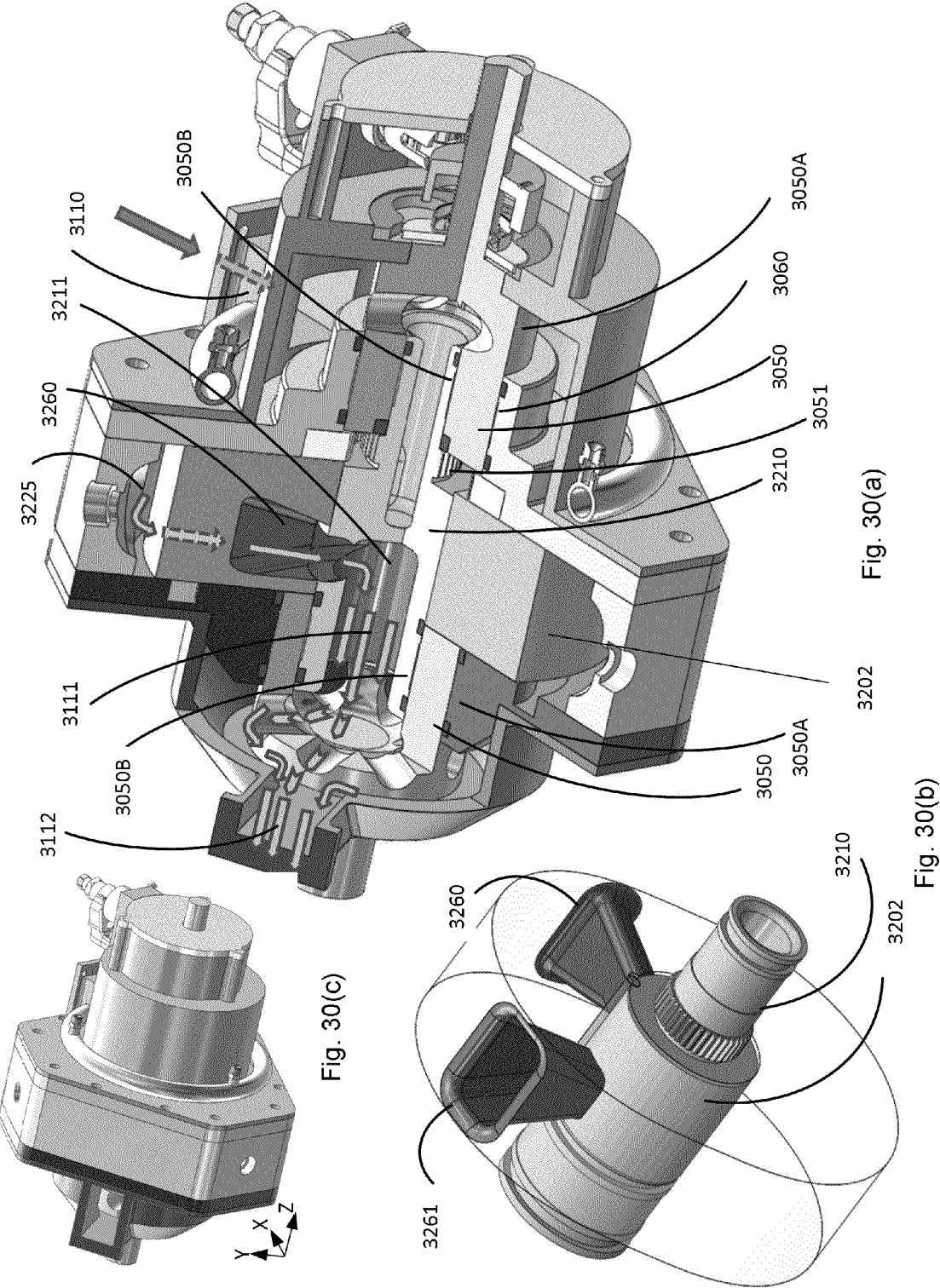

CYCLOID ROTOR ENGINE

PRIORITY

This patent application is a continuation application of U.S. patent application Ser. No. 13/434,827 filed Mar. 29, 2012, entitled "Cycloid Rotor Engine" and naming Nikolay Shkolnik and Alexander C. Shkolnik as inventors, and claims priority therefrom, and from provisional U.S. patent application No. 61/469,009, filed Mar. 29, 2011, entitled, "Cycloid Rotor Engine" and naming Nikolay Shkolnik and Alexander C. Shkolnik as inventors, the disclosures of which are incorporated herein, in its entirety, by reference.

TECHNICAL FIELD

The present invention relates to engines, and more particularly to rotary engines.

BACKGROUND ART

Rotary engines have promise of high efficiencies, high power densities and low part count, which have attracted numerous engineers and efforts to this filed. Among great many configurations existing in the prior art, one of the simplest and the most promising is based on the gerotor concept. With reference to FIGS. 1(a)-1(d), depicting prior art, and more specifically to FIG. 1(a), a gerotor includes an outer rotor rotatably mounted within the housing cavity (housing not shown) and having the female gear profile and inner rotor with male gear profile. In a course of its operation, both outer and inner rotor rotate within housing, forming a plurality of successive chambers of variable volume. These chambers could be used to execute compression or expansion of gas in compressors/pneumatic motors/engines or movement of liquids in pumps/hydraulic motors. An alternative configuration is for an outer rotor to be stationary while inner rotor wobbles, driven by an eccentric shaft. The variable volume chambers thus formed behave similarly to the first configuration. Frictional losses associated with these designs could be reduced by using a roller-vane gerotor design shown in FIG. 1(b). Instead of direct contact between the outer and inner rotors, rollers are incorporated to form the displacement chambers. In all of these designs an outer rotor is used not only to form the chambers but also to guide the inner rotor.

Having very few moving parts it is not surprising that this simple design has attracted attention of many who attempted to design a rotary engine around it. The major problem that could be traced to all rotary engines, however, is difficulty in sealing the working fluid during the compression, combustion and expansion strokes of the engines. While theoretically most of the engines look feasible on paper, since they completely encompass working fluid without using seals, in practice, when machining tolerances and thermal expansion are taken into account and also when parts are starting to wear out, the sealing of working fluid is not possible without seals. The most famous version of gerotor-based engine and the only one used in production is the Wankel engine, in which 3-lobe rotor moves inside of 2-lobe housing, as shown in FIG. 1(c). This engine was relatively successful for two main reasons. First, the outer rotor was not used to guide the inner rotor, but rather a pair of gears was used to synchronize the movement and rotation of the inner rotor with motion of the eccentric shaft. Second, the gap between the inner rotor and outer rotor, which is provided to allow for manufacturing tolerances, thermal expansion, and wear, was sealed by a grid work of seals, may be known as a "Wankel Grid", consisting of face seals located on flat part of the rotor and apex seals located within each apex of the rotor, and also "buttons" that connected both of these types of seals; all of these seals are located on the rotor, and therefore will move with the rotor. Together with rotor itself and the housing, in theory these seals completely encompassed the working fluid. Again, in practice, there are still gaps between the seals or seals and rotor and seals and housing, but these are relatively small and manageable and enable the engine to function. Having said this, it is well known that these engines have relatively low efficiency and high emissions and are unsuitable for compression ignition mode of operation due to:

1. Relatively high degree of leakage, despite the seal grid. For example, the bouncing of fast-moving apex seals, as well as holes into the engine to accommodate spark plug(s), contribute to leakage.
2. Large seal travel.
3. High thermal losses caused by very high surface to volume ratio of the combustion chamber at the moment of highest compression.
4. Low geometrically achievable compression ratio.
5. Necessity to meter oil into the working chamber to lubricate the apex seals, which can't get lubrication by any other means, and the existence of ports through which this oil is exhausted, causing emission problems.

Theoretically gerotor engines with a stationary outer rotor have just one major moving part—the rotor. This rotor, moving inside a housing, forms variable geometry cavities that contract and expand in a course of rotor's rotation. The sealing is accomplished by theoretical line contact between the rotor and the housing; such a contact is to occur at least in two places. In general, the gerotors are designed to have very small sliding contact between the rotor and the housing, though, attempts were made to implement "rolling without sliding"—see U.S. Pat. No. 7,520,738 to Katz as an example of such an effort. Another example is described in U.S. Pat. No. 5,373,819 to Rene Linder, which uses rollers in conjunction with an eccentric to guide a rotor within the housing. Yet another example is described in Russian patent RU 2078221 C1 to Veselovsky, which uses seals within a housing. In practice, as stated above, manufacturing tolerances and thermal expansion cause designers to leave a relatively large gap between the rotor and the housing or rotor and rollers. If housing and rotor are inflexible or if rollers can't accommodate for the thermal expansion or the preload due to machining tolerance, the sealing can't be accomplished. So, it becomes meaningless to talk about purely rolling contact between rotor and the housing. This gap has to be closed one way or another by the seal to enable a workable engine.

SUMMARY OF THE EMBODIMENTS

In a first embodiment of the invention there is provided an improved engine of the type including a cycloidal rotor having N lobes and a housing having a corresponding set of N+1 lobe-receiving regions for successively receiving the lobes as the rotor rotates about an axis relative to the housing, the housing having (i) a pair of sides axially disposed on first and second sides of the rotor, and (ii) a peak disposed between each pair of adjacent lobe-receiving regions, and (iii) an intake port and an exhaust port, wherein the improvement is defined by: a plurality of peak seals, at least one of the plurality of peak seals disposed on each peak and configured to maintain contact with the rotor throughout a period of rotation of the rotor, each seal being radially biased against the rotor throughout the rotation of the rotor, on account of the cycloidal geometry of the rotor and the lobe-receiving portions; a first passageway defined in the rotor to communicate cyclically between the intake port and a working chamber, the working chamber defined as a volume lying between two peak seals, the housing and the rotor; a second passageway, distinct from the first passageway, defined in the rotor to communicate cyclically between the exhaust port and the working chamber; a first face seal disposed between the first side and the rotor; a second face seal disposed between the second side and the rotor; wherein the passageways and the seals are configured to cause each seal to maintain contact with both the rotor and one of the sides through all angular positions of the rotor while avoiding communication with either of the ports.

In another embodiment, each peak seal has a contact region with the rotor, and the contact region is curved with a radius of curvature equal to the radius of curvature of a theoretical roller, which theoretical roller is uniquely defined by the geometry of the rotor and the geometry of the lobe-receiving regions.

In another embodiment, the rotor has a first axial face, a second axial face parallel to the first axial face, and a radial surface between the first axial face and the second axial face, and normal to, the first axial face and the second axial face, and wherein the first axial face and the radial face define a first edge of the rotor and the second axial face and the radial face define a second edge of the rotor, and wherein the first face seal is disposed at the first edge of the rotor.

In an further embodiment, the second face seal is disposed at the second edge of the rotor.

In another embodiment, the rotor has a first axial face, a second axial face parallel to the first axial face, and a radial surface between, and normal to, the first axial face and the second axial face, and wherein the first axial face and the radial face define a first edge of the rotor, and wherein the first face seal is disposed on the first axial face displaced from the first edge of the rotor, so as to define a first annular landing on the first axial face between the first edge and the first face seal, the engine further comprising and a button seal disposed so as to contact the rotor and the first face seal at the first annular landing.

In another embodiment, at a first angle of the rotor within the housing the working chamber forms a compression chamber having a maximum compression chamber volume, and at a second angle of the rotor within the housing the working chamber forms an expansion chamber having a maximum expansion chamber volume, the maximum expansion chamber volume being at greater than or equal to 1.0 times the maximum compression chamber volume.

In another embodiment, the maximum expansion chamber volume is at least 3 times the maximum compression chamber volume.

Another embodiment further includes a plurality of lubricant channels in at least one of the sides, each of the plurality of the lubricant channels disposed so as to deliver lubricant to a corresponding one of the plurality of peak seals.

Another embodiment further includes a lubricant channel in at least one of the sides, the lubricant channel disposed so as to continuously deliver lubricant to a corresponding one of the face seals.

In another embodiment is an improved engine of the type including a rotor having N lobes and a housing having a corresponding set of N+1 lobe-receiving regions for successively receiving the lobes as the rotor rotates about its axis and orbits about an axis relative to the housing, the housing having (i) a pair of sides axially disposed on first and second sides of the rotor, and (ii) a peak disposed between each pair of adjacent lobe-receiving regions, and (iii) an intake port and an exhaust port, wherein the improvement includes: a first passageway defined in the rotor to communicate cyclically between the intake port and a working chamber defined as a volume lying between two peak seals, the housing and the rotor; a second passageway, distinct from the first passageway, defined in the rotor to communicate cyclically between the exhaust port and the working chamber; a sealing grid comprising a plurality of peak seals, at least one of the plurality of peak seals disposed on each peak and configured to maintain contact with the rotor, such seal being radially biased against the rotor; and one of: a face seal disposed on the rotor and configured to maintain contact with the sides of the housing such seal being axially biased against the housing side, where over the course of rotation the face seal does not cross over the intake or exhaust port, and 2×(N+1) button seals, one for each side of every peak, disposed within the housing side, axially biased toward the rotor and configured to maintain contact with the peak seal and the face seal, and a face seal disposed on the rotor and configured to maintain contact with the sides of the housing and a chamfered portion of the rotor, such face seal being axially biased against the housing side; wherein the ports, passageways and face seal are configured to cause the face seal to maintain contact with both the rotor and one of the sides of the housing through all angular positions of the rotor while avoiding said face seal crossing over either of the ports.

In another embodiment, the face seal is a wire seal.

In another embodiment, the face seal is disposed at an edge of the rotor, which edge is defined by the intersection of an axial face of the rotor with a radial face of the rotor.

In another embodiment, the profile of the face seal is generated as a cycloidal curve in which the radius of the theoretical roller used to generate the cycloidal curve is the radius of the button in the button seal.

In another embodiment, the rotor is of a cycloidal geometry defined by a set of N+1 theoretical rollers, and each peak seal has a contact region with the rotor, and the contact region is curved with a radius of curvature approximating a radius of curvature of the theoretical roller that the peak seal replaces.

Another embodiment includes a housing having a working cavity, and a combustion chamber in fluid communication with the working cavity; a piston disposed on the housing and configured to controllably enter into and withdraw from the combustion chamber; a rotor rotatably mounted within the working cavity, so as to form a working chamber of variable volume with the housing, at different angles of rotation of the rotor within the working cavity; and a controller synchronized to the angle of rotation of the rotor to controllably cause the piston to enter into and withdraw from the combustion chamber, so as to cause the combined volume of the working chamber and the combustion chamber to be constant over a range of angles of rotation of the rotor.

Another embodiment includes a housing having a working cavity; a shaft, the shaft having an eccentric portion; a rotor having a first axial face, and a second axial face opposite the first axial face, the rotor disposed on the eccentric portion and within the working cavity, the rotor comprising a first cam on the first axial face, the first came having an eccentricity corresponding to the eccentricity of the eccentric portion of the shaft; and a cover integral with, or fixedly attached to, the housing, the cover comprising a plurality or rollers, each roller engaged with the cam, wherein the cam guides the rotation of the rotor as the rotor rotates within the working cavity and orbits around the shaft.

Another embodiment includes a second cam on the second axial face of the rotor.

BRIEF DESCRIPTION OF THE DRAWINGS

The foregoing features of embodiments will be more readily understood by reference to the following detailed description, taken with reference to the accompanying drawings, in which:

FIGS. 2(a)-2(c) schematically illustrate an embodiment of an embodiment of a cycloid rotor engine;

FIGS. 4(a)-4(d) schematically illustrate geometries of forming components of a cycloidal engine;

FIGS. 7(a)-7(d) schematically illustrate the interaction between embodiments of engine housings and intake and exhaust passages in a rotor;

FIG. 9 schematically illustrates the position of a face seal with respect to intake ports at a variety of rotor angles;

FIGS. 10(a) and 10(b) schematically illustrate embodiments of a face seal;

FIGS. 12(a)-12(g) schematically illustrate embodiments of components of a sealing grid;

FIGS. 13(a)-13(g) schematically illustrate embodiments of a face seal;

FIGS. 15(a)-15(c) schematically illustrate embodiments of components of a sealing grid;

FIG. 17 schematically illustrates an embodiment of a peak seal;

FIG. 18 schematically illustrates an embodiment of a peak seal;

FIGS. 22(a)-22(c) schematically illustrate an embodiment of a gerotor engine;

FIG. 23 schematically illustrates an embodiment of a rotor for a rotary engine;

FIG. 24 schematically illustrates an embodiment of a rotor for a rotary engine;

FIG. 25 schematically illustrates an embodiment of a rotor for a rotary engine;

FIGS. 30(a)-30(c) schematically illustrate an embodiment of a rotary engine;

DETAILED DESCRIPTION OF SPECIFIC EMBODIMENTS

Figure 1A:
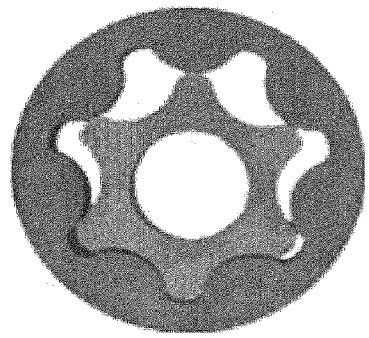
FIGS. 1(a)-1(d) schematically illustrates prior art rotary engines using gerotors.
Figure 1B:
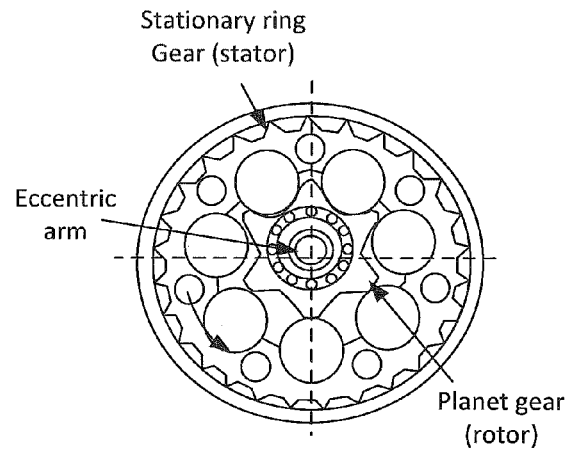

Various embodiments provide improved rotary engines that operate at higher efficiency, with lower exhaust emissions, than traditional piston or rotary engines. These characteristics allow improved fuel efficiency, and also make engines more environmentally friendly than traditional rotary engines, such as the Wankel rotary engine, for example, as used for decades by the Mazda corporation.

Unlike previous internal combustion engines, illustrative embodiments use a cycloid (or cycloidal) rotor that rotates within a fixed housing.

As used in this description and the accompanying claims, the following terms shall have the meanings indicated, unless the context otherwise requires:

Cycloidal: The term "cycloidal" refers to the geometry of a rotor in some embodiments of a rotary engine. The rotor (which may be described as a "cycloid disk") has Z1 number of lobes. The rotor geometry is generated based on Z2 theoretical rollers, where $Z2=Z1+1$, and the theoretical rollers have radius $R_r$ and are located a distance R away from a central point.

The rotor (cycloid disk) profile may be mathematically generated using equations derived by Shin and Kwon [see Shin, J. H., and Kwon, S. M., 2006, "On the Lobe Profile Design in a Cycloid Reducer Using Instant Velocity Center," Mech. Mach. Theory, 41, pp. 596-616]:

$$C_x = R\cos\phi - R_r \cos(\phi+\psi) - e\cos((Z_1+1)\phi)$$

$$C_y = -R\cos\phi + R_r \sin(\phi+\psi) + e\sin((Z_1+1)\phi) \quad (1)$$

where $\phi$ is the angle of the input shaft and $\psi$ is the contact angle between the cycloid lobe and roller calculated as $$\psi = \tan^{-1}\left[\frac{\sin(Z_1\phi)}{\cos(Z_1\phi) - \frac{R}{e(Z_1+1)}}\right] \quad (2)$$

A rotary engine or even a rotary compressor can be built using this geometry for any Z1 from 1 to infinity. For example, various embodiments described below have rotors in which $Z1=2$ and $Z2=3$, with an understanding that any Z1 could be used as well and that the application is not limited to engines but is also applicable to compressors, pumps and hydraulic or pneumatic motors.

Maximum volume of a compression chamber: the maximum volume of a compression chamber is the volume of the compression chamber (which is a working chamber at that phase of an engine cycle when working medium within the working chamber is fresh, e.g., air, and is being compressed prior to combustion) at the point in the engine cycle when the chamber is first cut off from the environment outside of the engine. For example, in the engine 200, the maximum volume of the compression chamber is the volume of that chamber just after the intake passage has been eclipsed so that there is no longer a fluid passage from the compression chamber to the environment outside of the engine housing.

Maximum volume of the expansion chamber: the maximum volume of an expansion chamber is the volume of an expansion chamber (which is a working chamber at that phase of an engine cycle when working medium within the working chamber has combusted and is performing work on the rotor) at the last point in the engine cycle before the chamber is exposed to the environment outside of the engine. For example, in the engine 200, the maximum volume of the expansion chamber is the volume of that chamber just before the exhaust passage ceases to be eclipsed, so that there remains, at that last moment, no fluid passage from the exhaust chamber to environment outside of the engine housing.

Figures 3A, 3B, 3C, 3D, 3E, 3F:
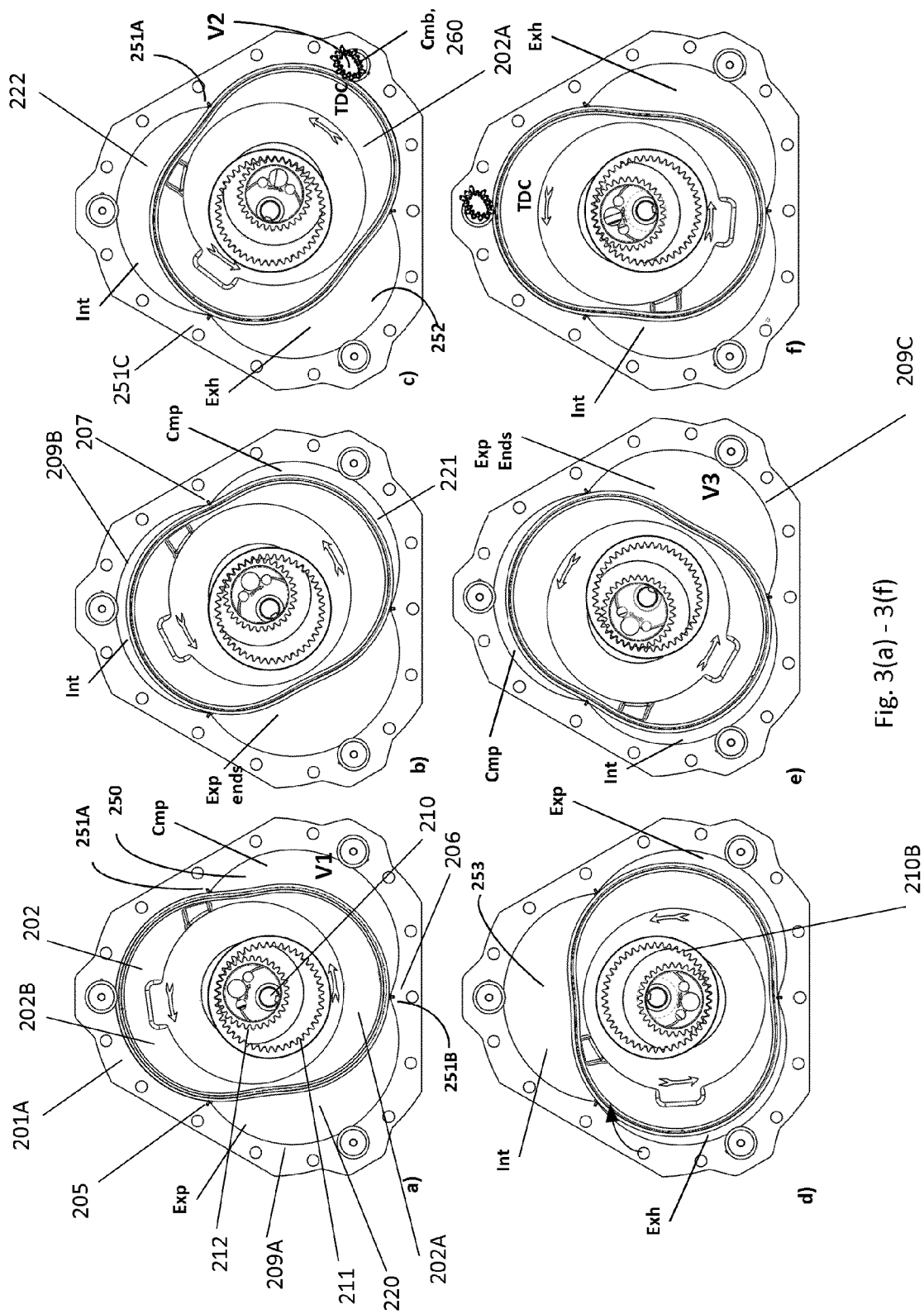
FIGS. 3(a)-3(f) schematically illustrate an embodiment of a cycloid rotor engine at various points in execution of an engine cycle.

Angle, or angle of rotation. An engine's rotor is configured so that it may rotate and orbit within the engine. In some embodiments, a rotor orbits the axis of the engine defined by its input/output shaft, driven by the eccentric shaft and with angular velocity of the shaft, while at the same time rotor rotates around its own axis at some angular speed of the shaft and in opposite direction by synchronization means, defined in below. At various positions, the rotor forms various working chambers, and engages intake and exhaust ports, etc. References to the angle of a rotor, or the angle of a rotor's rotation, are references to the position of the rotor within the housing. For example, in FIG. 3(*f*), if the position of the rotor is deemed to be 0 degrees, then the position of the rotor in FIG. 3(*c*) would be displaced 60 degrees counterclockwise.

Working medium: the term "working medium" refers to a gas within an engine, and may include, for example, air passing into an intake chamber, air being compressed within a compression chamber, gas within a combustion chamber, and gas within an expansion chamber. A working medium may contain fuel (e.g., gasoline or diesel fuel), or may include the byproducts of combustion.

Eccentricity: the distance between the center of rotation of a shaft, and the geometric center of a circular eccentric fixed to the shaft.

Overview of an Illustrative Embodiment of an Engine

FIG. 2(*a*) schematically illustrates one embodiment of a cycloid rotary engine 200, FIG. 2(*b*) schematically illustrates the cycloid rotary engine 200 in an exploded view and FIG. 2(*c*) schematically illustrates the cycloid rotary engine 200 in a cutaway view. The engine 200 includes a housing 201 having a body 201A (which may be known as a "circumferential body") having an aperture 201B, an intake cover 201C and an exhaust cover 201D. In some embodiments, the intake cover 201C and/or the exhaust cover 201D are an integral part of the body 201A, and form a flat surface axially displaced from, and facing, the rotor 202. As such, the intake cover 201C and/or the exhaust cover 201D may be referred to simply as a flat part of the housing 201. The body 201A, the intake cover 201C and the exhaust cover 201D bear a fixed spatial relationship to one another, and together they define a cavity for housing the cycloid rotor 202.

In addition to the housing 201, FIGS. 2(*a*) and 2(*b*) include a number of other elements of the engine 200. An optional fan 203 provides air flow to the engine 200 for cooling purposes, and/or may supply a fresh air charge for use in executing an engine cycle. If fan is not used, a fresh air charge will be supplied by induction action of the rotor that, in a course of its rotation creates a vacuum during certain parts of the cycle. An optional oil pump 204 provides oil to interior components of the engine as described further below. The engine 200 also includes intake and exhaust manifolds 225 and 226, along with a fuel pump 227 and fuel injectors 208 for providing fuel for combustion in the engine 200.

Figure 6:
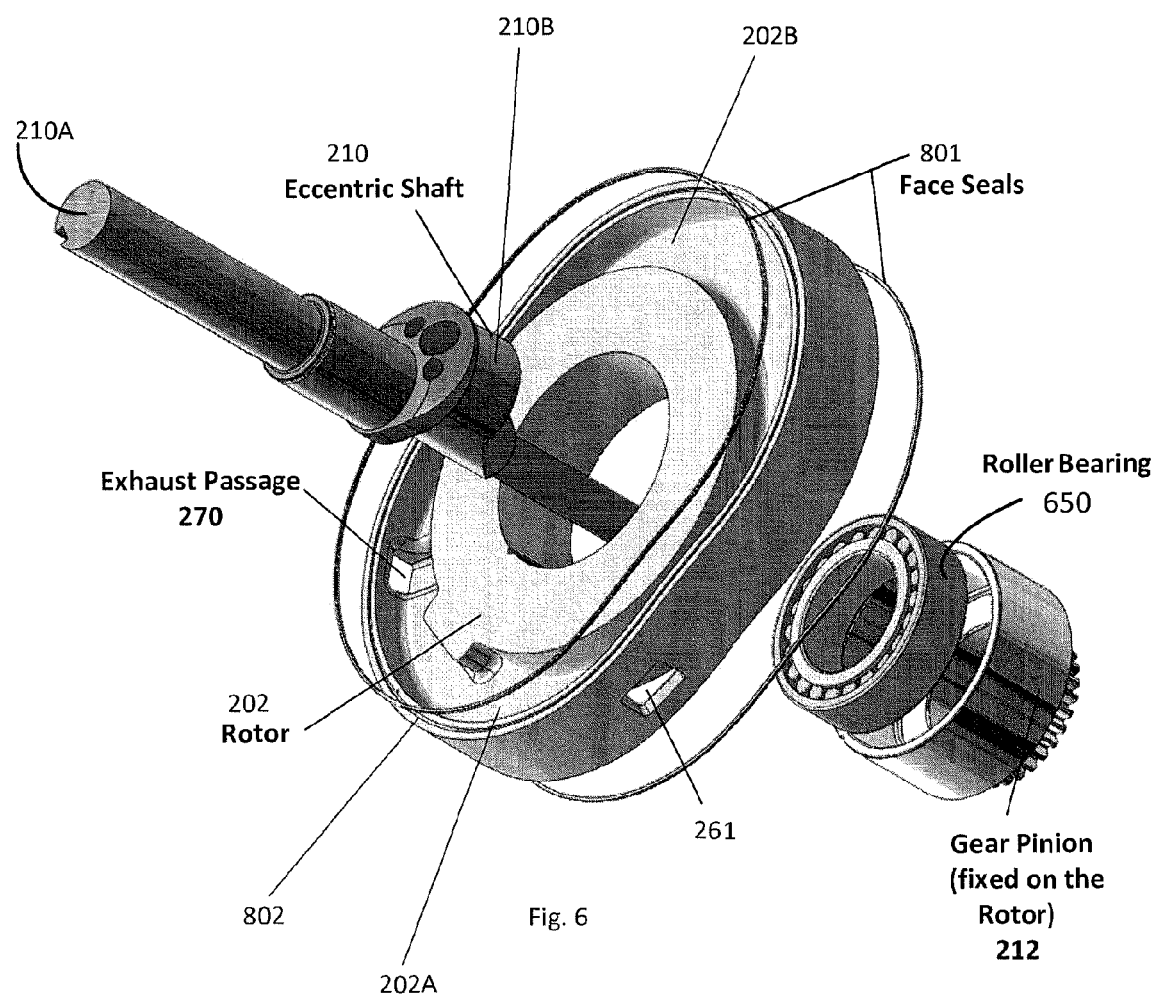
FIG. 6 schematically illustrates a rotor assembly of an embodiment of a cycloid rotor.
Figure 7D:
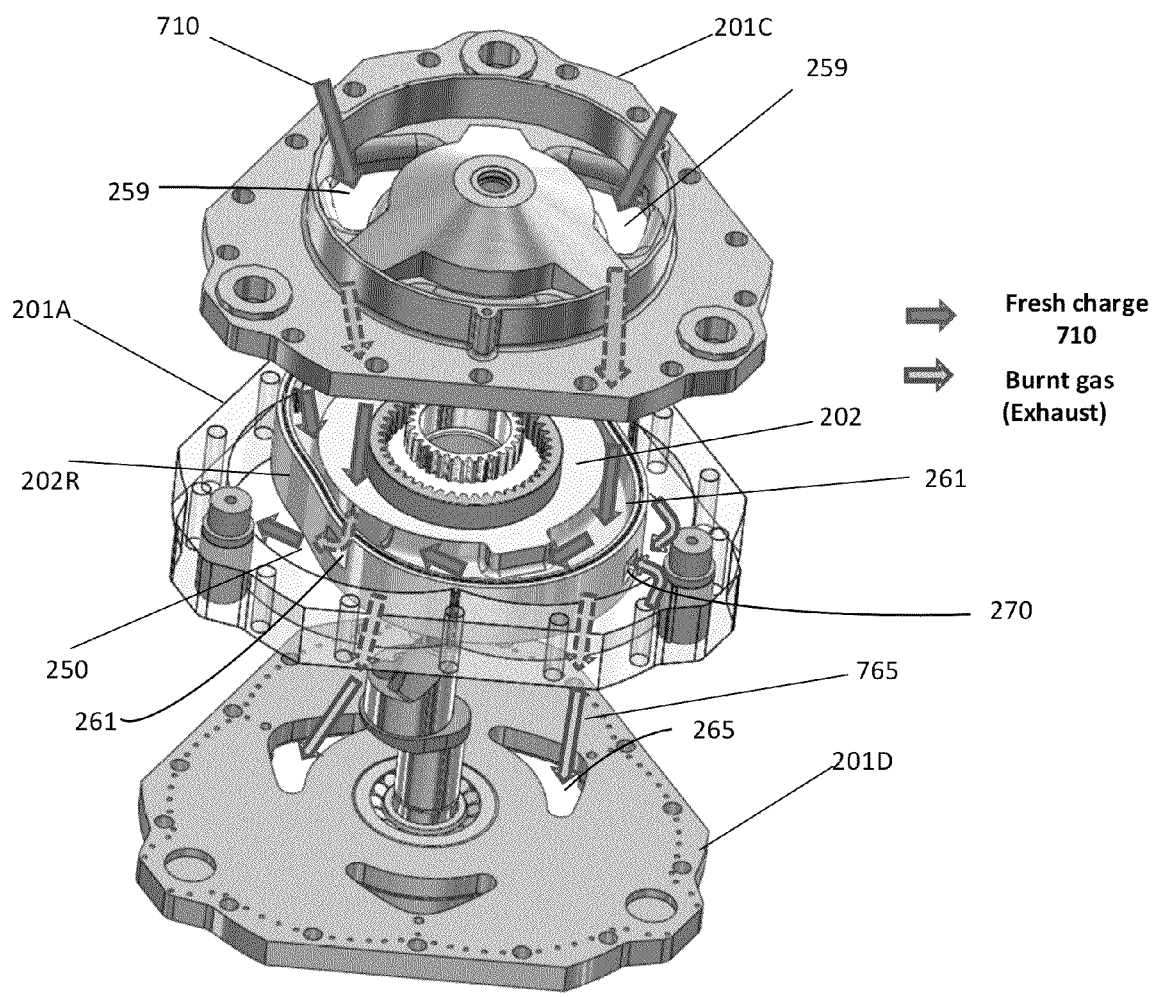

Within the engine 200, the rotor is rotatably coupled to an eccentric shaft 210, better seen in FIG. 6, which may be referred to simply as the "shaft." The eccentric shaft 210 is configured to rotate about the center point (or axis) 210A of the shaft 210, and includes an eccentric part 210B, which is offset from the shaft by eccentricity "e". A force applied to the eccentric part 210B of the shaft 210 will act on the shaft 210, causing the shaft 210 to rotate.

In this embodiment, the rotor 202 has two lobes 202A, 202B, and the aperture 201B has three lobe-receiving regions 220, 221 and 222, as schematically illustrated in FIG. 3.

The lobes 202A, 202B are curved and have a curvature. The lobe-receiving regions 220, 221 and 222 are defined by an equal number of intersecting curves, which form an equal number of peaks 205, 206, 207, one peak at each intersection. The curves 209A, 209B, 209C that define the lobe-receiving regions have a curvature of a similar shape to the curvature of the lobes, so that the inside curve of the lobe-receiving regions 220, 221 and 222 is the same as the outside curve of a lobe 202A, 202B—with the exception that a small gap should exist between the two curves to accommodate manufacturing tolerances and thermal expansion for components—so that any of the lobes may completely occupy any of the lobe-receiving regions, as explained more fully below.

Each peak 205, 206, 207, in turn, has a peak seal 251A, 251B, 251C, and each peak seal is radially biased so as to be in continuous sealing contact with the rotor 202, to form a number of working chambers, as described more fully below.

FIGS. 3(*a*)-3(*f*) schematically illustrate engine 200 at various phases of its operation, during which the geometric center of rotor 202 orbits around the center 210A of shaft 210 and the rotor 202 rotates around its center with half the angular speed, and in the opposite direction of, the shaft 210. The synchronization mechanism, in this case an internal gear 211 fixed on the cover and pinion 212 fixed on the rotor in relationship 3:2 causes the shaft 210 to turn in a direction counter to the direction of rotation of the rotor 202. For example, in FIGS. 3(*a*)-3(*f*), the rotor 202 turns counterclockwise, and the shaft 210 turns clockwise.

As the rotor 202 turns inside the aperture 201B, the housing 201 and the rotor 202 cooperate to form three working chambers 250, 252, 253 for executing an engine cycle. More specifically, each working chamber is defined by the circumferential housing 201A, the rotor 202, a number of seals, and the sides 201C, 201D of the housing.

For example, one working chamber 250 is formed by the rotor 202, circumferential housing 201A, and seals 251A and 251B, along with the sides 201C and 201D, and other seals between the rotor and the sides. For ease of illustration, the other seals are not shown in FIGS. 3(*a*)-3(*f*).

As illustrated in FIG. 3(*a*), the working chamber 250 has a finite volume, and is not coupled to the environment external to the engine 200. As the rotor 202 turns counter-clockwise, a gas or working medium (e.g., air which has been inducted into the working chamber 250 prior to this moment) is compressed from its initial volume (V1). As the rotor 202 continues to turn, one lobe 202A of the rotor 202 proceeds to occupy progressively more of the lobe-receiving region 221, thereby progressively compressing the gas within the working chamber 250. As such, working chamber 250, at this stage of the engine's cycle, may be known as a "compression chamber."

Eventually, the lobe 202A completely occupies the lobe-receiving region 221, as schematically illustrated in FIG. 3(*c*). In this position, the lobe 202A has forced all of the gas within the compression chamber into a combustion chamber 260 within the circumferential body 201A. The combustion chamber 260 has a fixed volume (V2).

This position of the rotor 202 within the lobe-receiving region 221 may be known as "top dead center" or "TDC." At this point in the engine's cycle, fuel within the combustion chamber ignites, causing heat to be added to the gas, and thereby greatly increasing the pressure of the gas.

Ignition may be initiated in a variety of ways known in the art. However, in this embodiment, the ratio of the initial volume of the compression chamber (V1) and the volume of the combustion chamber (V2) at top dead center may be as high as 30 or more. As such, the fuel and gas mixture within the working chamber may be ignited by compression ignition. Indeed, fuel may be injected into the working chamber before the combustion chamber is closed (e.g., during compression), or at or after the moment that the combustion chamber is closed.

As the rotor 202 continues to rotate, the lobe 202A is substantially stationary for a brief period of time (or over a small angle of rotation) within the lobe-receiving region 221. In other words, while the lobe 202A is at top dead center, the rotation of the shaft 210 effectively causes lobe 202A to pivot within lobe-receiving region 221 before eventually beginning to withdraw from the lobe-receiving region 221 (FIG. 3(d)). As such, the volume of the working chamber (i.e., combustion chamber) at and about top dead center is substantially constant for a portion of the angular rotation of the rotor 202. As a practical matter, a change in volume of the working medium trapped in the combustion chamber over about 5 to 10 degrees of rotation, due to aerodynamic properties of the gas moving through a very small gap between rotor and the housing is less than one-half of one percent (0.5%) of the volume of the combustion chamber may be considered to be an effectively constant volume or a substantially constant volume.

Figure 8A:
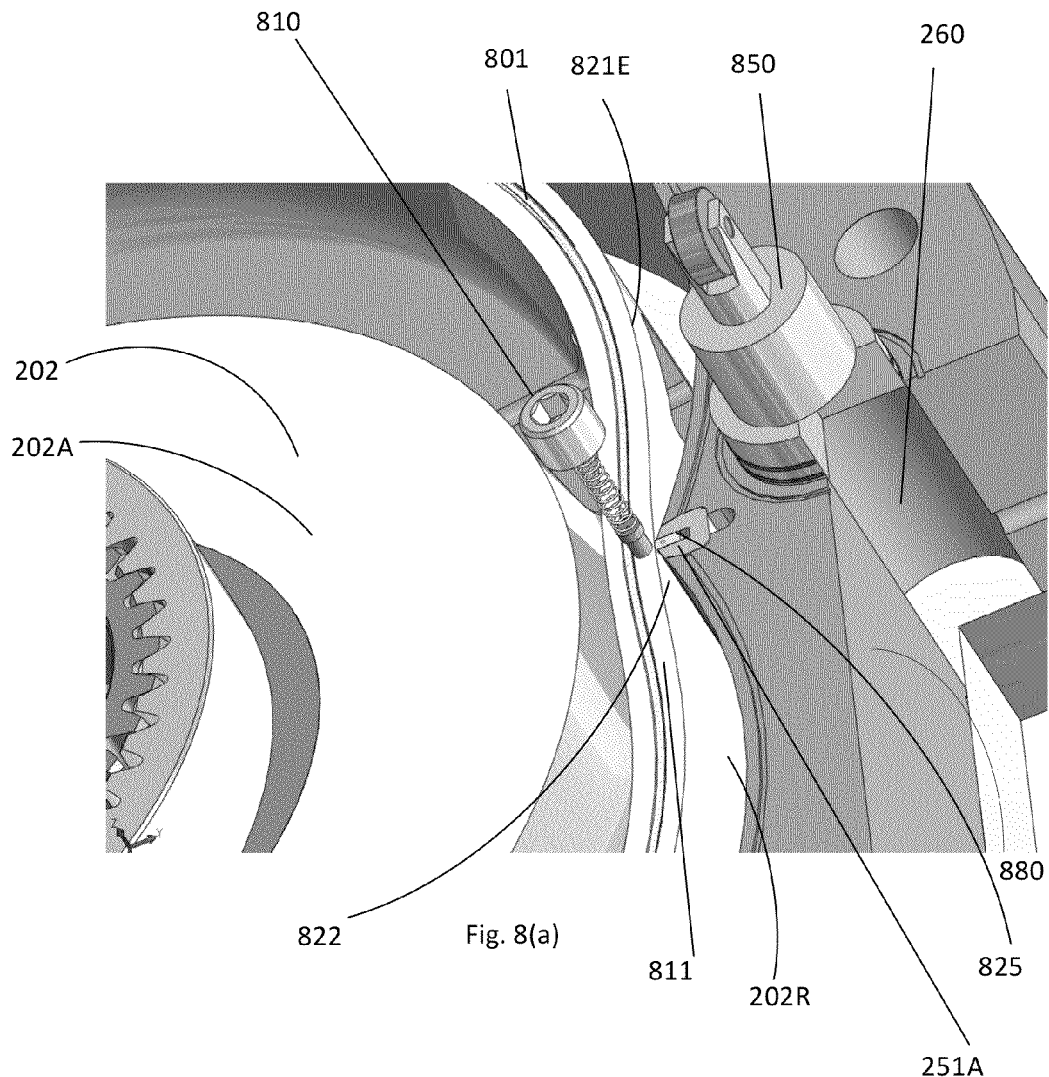
FIGS. 8(a)-8(b) schematically illustrate embodiments of a seal grid, along with an embodiment of a combustion chamber piston.

Some embodiments have a substantially constant volume for a longer period of time (or greater angle of rotation of a rotor) than could be afforded by rotating rotor. For example, as schematically illustrated in FIG. 8(a), some embodiments include a piston 850 that is controllably extendable into the combustion chamber 260. For example, in some embodiments, the piston 850 may extend into the combustion chamber 260. As the rotor 202 reduces the volume of the compression chamber, the working medium within the compression chamber is forced into the combustion chamber 260. At a predetermined point in the engine cycle, the piston 850 begins to withdraw from the combustion chamber 260 so as to provide additional volume within the combustion chamber 260 to exactly match the reduction in volume of the compression chamber. Similarly, as the rotor 202 turns past the combustion chamber 260, the piston 850 may begin to occupy progressively more of the combustion chamber 260. In this way, the combined volume of the compression chamber and the combustion chamber 260 may be held constant over a given range of the rotor's travel.

In various embodiments, the small piston 850 may be spring loaded, or driven externally by cam, electric or hydraulic drives synchronized to the engine cycle. Any such drive mechanism may be known as a "controller." If driven externally, the piston 850 extends into the combustion chamber 260 and can be controlled so as to maintain a constant volume combustion chamber 260 for a much longer duration. Alternately, the piston 850 may aid in a very rapid compression or in variable compression ratio engines—all of these useful in different modes of operation of the engine, for the purpose of increasing engine efficiency, or enabling the engine to operate on a multitude of fuels. Alternatively, the volume (and the composition) of the gasses during combustion phase could be controlled by water injection.

Returning to FIGS. 3(a)-3(f), after combustion, the gas within the working chamber 250 begins to expand, thereby forcing the rotor 202 to recede from the lobe-receiving region 221, as schematically illustrated in FIG. 3(d). During this phase of the engine cycle, the working chamber 250 may be known as an "expansion chamber." At its point of maximum expansion, the expansion chamber has a volume (V3) that is greater than the maximum volume (V1) of the compression chamber. In some embodiments, the maximum volume of the expansion chamber (V3) may be equal to the maximum volume of the expansion chamber, and in other embodiments the volume of the expansion chamber (V3) may be greater than the maximum volume (V1) of the compression chamber. In some embodiments, the volume of the expansion chamber (V3) may be 1.1 to 3 times greater than the maximum volume (V1) of the compression chamber. For example, FIGS. 32(a)-32(f) schematically illustrate an embodiment in which the intake and exhaust passages have been configured such that volume V3 is greater than volume V1. In some embodiments, the configuration of the intake and exhaust passages may be described as "asymmetric," meaning that the intake passage engages a working chamber at a different angle of rotation of the rotor, and/or over a smaller range of angles of rotation of the rotor, than the angle (or range of angles) at which the exhaust passage engages the working chamber.

The expanding gas within the expansion chamber 250 exerts force on the rotor 202, thereby causing the rotor 202 to continue its rotation around the eccentric shaft 210, and thereby causing the eccentric shaft 210 to rotate about its axis 210A in a direction counter to the direction of rotation of the rotor 202. In this embodiment, the shaft 210 rotates clockwise, as indicated by the arrow on the eccentric 210B.

As expansion concludes, and the rotor 202 continues to rotate, the exhaust passageway (see FIGS. 7(a)-7(d)) in the rotor 202 communicates with working chamber 250. The exhaust passageway interfaces with the exhaust port, thereby exposing the working chamber 250 to the environment outside of engine 200, so that the exhaust gases may exit the engine 200. As the rotor 202 continues to turn, the working chamber volume is reduced and exhaust gasses are expelled.

As the rotor 202 continues to rotate, an intake passageway (see FIGS. 7(a)-7(d)) in the rotor is exposed to the working chamber, this intake passageway communicates with an intake port in the housing side. In this way, the working chamber 250 is eventually exposed to the environment outside of the engine 200, so that fresh air (which may be known as a fresh "charge") may be inducted into the working chamber 250 as this volume is increasing with further rotation of the rotor. When the working chamber is exposed to the environment outside of engine 200, the volume of the working chamber 250 may be characterized as not having a finite volume. Nevertheless, when exhausting the exhaust gases, the chamber 250 may be known as an "exhaust chamber," and while inducting a fresh charge, the chamber 250 may be known as an "intake chamber."

Although the foregoing discussion focuses on working chamber 250, FIGS. 3(a)-3(f) also reveal that the engine 200 also forms two other working chambers 252 and 253. Each working chamber executes a cycle including intake, compression, combustion, expansion and exhaust, as described above in connection with chamber 250. In this embodiment, the phases of the engine cycle for each of the working chambers are 120 degrees out of phase with each of the other working chambers. At any given point in the cycle, the chamber undergoing expansion not only turns the eccentric shaft, but also powers the phases executing in the other two working chambers.

A number of observations about the engine 200 and its operation may be useful at this point. First, the rotor 202 is in contact with all three of the peak seals 251A, 251B, 251C at all angles of rotation of the rotor 202. Indeed, this is a characteristic of the cycloid rotor that has beneficial consequences as described more fully below.

Also, although the present embodiment has a rotor with two lobes 202A, 202B, and a stationary aperture 201B with three lobe-receiving regions 220, 221, 222, other embodiments may have different numbers of lobes and lobe-receiving regions, with the number of lobe-receiving regions being one more (N+1) than the number of lobes (N) on the corresponding rotor. Also, in other embodiments, both the (N+1)-lobed "housing" and the N-lobed rotor to rotate around another fixed housing, or the N-lobed rotor may be stationary and the (N+1)-lobed "housing" rotates around the rotor.

Housing

Figure 5:
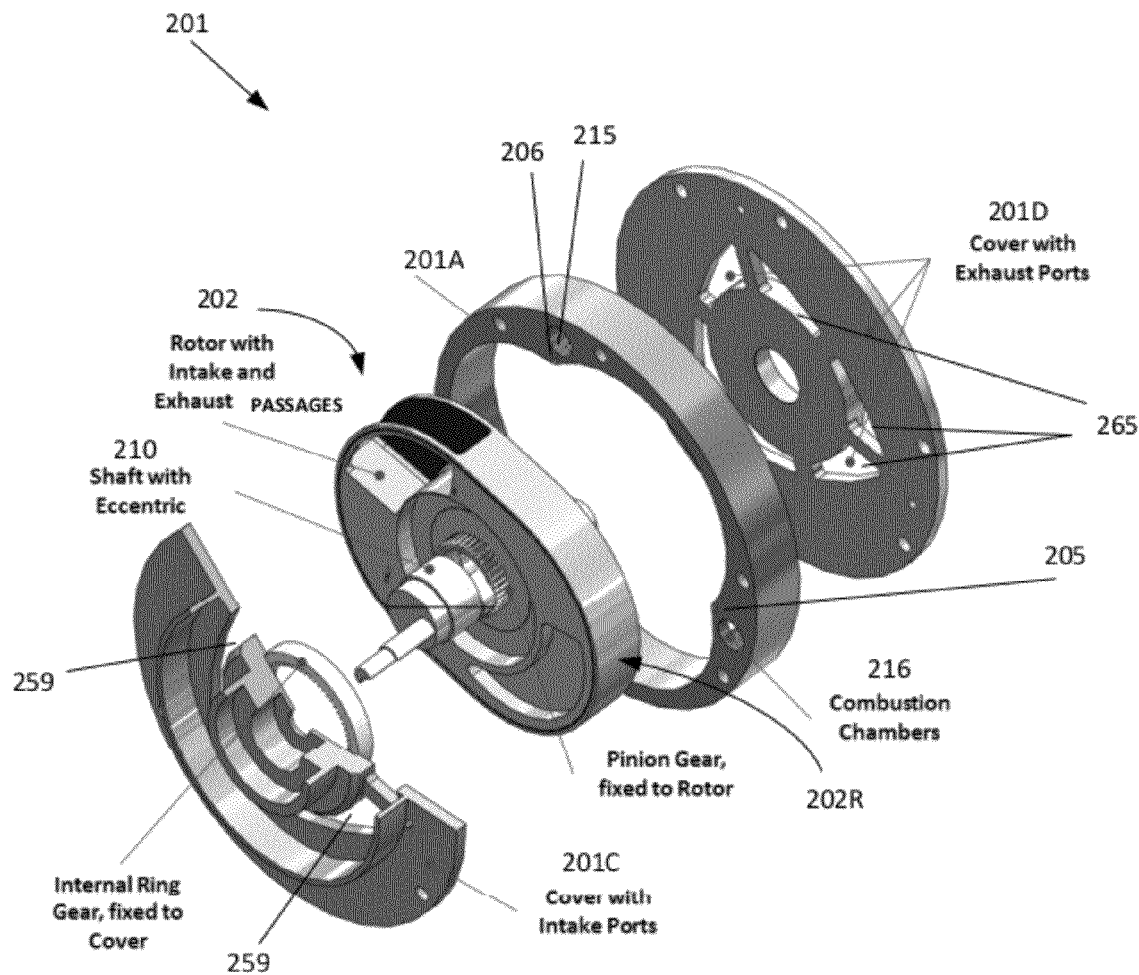
FIG. 5 schematically illustrates various components of an embodiment of a cycloid rotor engine.

More detailed views of embodiments of housings and rotors are provided in FIG. 5 and FIG. 6. FIG. 5 schematically illustrates an exploded view of the housing 201 and rotor 202, showing the circumferential body 201A between the intake cover 201C and exhaust cover 201D. Two of the three peaks 205, 206 are visible in FIG. 5, along with two of the three combustion chambers 215 and 216. The third peak 207 and the third combustion chamber 217 are not visible in FIG. 5 because they are blocked by the rotor 202. However, all three peaks 205, 206, 207 are schematically illustrated in the embodiments of FIGS. 7(a)-7(c). FIG. 6 is discussed below.

Circumferential Body

The body 201A has three lobe-receiving regions that are intimately related to the rotor 202. For a given rotor coupled to an eccentric with known eccentricity "e," the geometry of the aperture in a corresponding circumferential body is determined by specifying a set of theoretical rollers 410, 411, 412 disposed on a generating curve 413, as shown in FIGS. 4(a)-4(d). Each of the theoretical rollers 410, 411, 412 has a cylindrical shape with a radius Rr, and the theoretical rollers 410, 411, 412 are spaced equidistantly around a generating circle 413 of radius R. Also, the shape of the rotor 401 is determined by the radius Rr and the radius R, according to the cycloid equations recited above.

The geometry of the aperture is then determined by placing the rotor 401 at top dead center of each of the theoretical rollers 410, 411, 412. The opposite end of the rotor 401 then defines the curve 420, 421, 422 of a lobe-receiving region. As a practical matter, consideration must be given to construction of a practical curve of a lobe-receiving region by providing for a gap between the rotor and housing at the rotor receiving regions that will take into account manufacturing tolerances and thermal expansion of components. As this process is repeated for each of the theoretical rollers 420, 421, 422, the geometry of the aperture 430 is defined. The locations of the theoretical rollers correspond to the peaks of the circumferential body. Note that in some embodiments, actual rollers 420, 421, 422 may be fabricated having the dimensions of a "theoretical" roller, and such rotors exist in reality, and not theoretical.

As such, there is a unique relationship between the aperture 430, the rotor 401 and the theoretical rollers 410, 411, 412. As a consequence, the geometry is of the rotor and aperture is completely defined by R and Rr. The radius Rr may be useful in determining the geometry of peak seals or peak rotors, as discussed below.

The cycloid geometry provides a number of beneficial features. For example, the cooperating geometries of the lobe and lobe-receiving region yield a very high compression ratio (i.e., the ratio between the maximum and minimum volumes of a compression chamber, where the minimum volume of the combustion chamber defines a constant combustion chamber volume). In the engine 200, the compression ratio is on the order of between at least 12 to 25, although higher ratios are possible as well. This is an improvement over prior art rotary engines. For example, it is well known that for Wankel engine the practical limit is on the order of about 10, which is not sufficient for compression ignition. That is why there exist no naturally aspirated Wankel diesel engines.

As a practical matter, it is desirable to minimize the gap between the rotor and the housing when rotor located at its "top dead center", i.e. when geometrically, the working chamber volume is at its smallest.

Covers and Rotor

The intake cover 201C includes apertures that form intake ports 259 to allow air to enter the various working chambers within engine 200. For consideration of symmetry, 3 apertures are chosen in 3-lobe housing configuration, though, different number can be chosen as well.

In this embodiment, rotor 202 includes an intake passage 261 between an intake face 202F of the rotor 202 and the radial face 202R of the rotor 202. In other embodiments, the intake passage may pass through the shaft, while still in others, these two methods could be mixed and matched. For example, some embodiments may have exhaust ports on a cover or side of the housing, as in FIG. 7(d), and an intake port through the shaft, as in FIG. 30(a).

The intake passage 261 is intermittently exposed to the intake port 259. Over a range of angles of rotation within the housing, the intake passage 261 will be exposed to a working chamber, creating a temporary intake conduit 262 from the environment outside of the engine 200 into the working chamber. The temporary intake conduit 262 will exist over a range of angular rotations of the rotor 202 within the housing 201, as long as the intake passage 261 is at least partially exposed to the working chamber. At other angular rotations of the rotor 202 within the housing 201, the same intake passage 261 will cyclically align with each of the other working chambers to create a temporary intake conduit to each of these other working chambers.

The exhaust cover 201D includes apertures that form exhaust port 265 to allow spent working medium to exit the various working chambers within engine 200. Similarly to intake cover, for consideration of symmetry, 3 apertures are chosen in 3-lobe housing configuration, though, different number can be chosen as well.

In this embodiment, rotor 202 includes an exhaust passage 270 between an exhaust face 202G of the rotor 202 and the radial face 202R of the rotor 202. In other embodiments, the exhaust passage may pass through the shaft, while still in others, these two methods could be mixed and matched. For example, some embodiments may have intake ports on a cover or side of the housing, as in FIG. 7(c), and an exhaust port through the shaft, as in FIG. 30(a).

In some embodiments, the exhaust passage 270 is intermittently exposed to the exhaust port 265, while in other embodiments the exhaust passage is continuously exposed to the exhaust port 265. Over a range of angles of rotation within the housing, the exhaust passage 270 will align with one of the working chambers, creating a temporary exhaust conduit from the given working chamber to the environment outside of the engine 200. The temporary exhaust conduit will exist over a range of angular rotations of the rotor within the housing, as long as the exhaust passage is at least partially aligned with the working chamber. At other angular rotations of the rotor within the housing, the same passage will cyclically align with each of other working chambers to create a temporary exhaust conduit from each of these other working chambers. The exhaust passage 270 may optionally contain a check valve to prevent back flow of exhaust into the engine during the intake process, while both the exhaust passage and intake passage may be exposed to the working chamber at the same time for a brief period of overlap.

One or both of covers 201C and 201D include a bearing (650, FIG. 6) to support the shaft. The bearing 650 could be of any conventional types, including journal (hydrodynamic) type—this may be especially valuable since this affords especially simple configuration as shown in FIG. 30(*a*). Also, in this configuration the input/output shafts that eccentrically and rotationally hold the rotor's shafts are used as counterbalances as well. As such they may be made of heavy metals, such as tungsten or have heavy metal inserts.

FIG. 6 schematically illustrates an exploded view of the rotor 202 and the eccentric shaft 210. To accommodate face seals 801, the rotor 202 has two grooves 802 (one in each face of the rotor) in which two face seals 801 are disposed. These grooves 802 are generated such that a face seal 801 within the groove 802 will be in in constant contact with the button seal 810. As such, in some embodiments the landing 811 on the rotor 202 has a constant width, while in other embodiments the landing 811 may have a width that varies at different points on the rotor 202. Also, the engine has three points (in general, N+1 points for an engine with an N-lobe rotor) in each housing side (cover), 201C, 201D in the vicinity of each peak 205, 206, 207 where such point in the housing side 201C or 201D is in continuous contact with the face seal 801. Oil supply ports (such as 271A and 271B in FIG. 2(*b*), for example) in the housing sides 201C, 201D are located over at least one of these points. As such, the design assures that the entire face seal 801 will, as the rotor 202 rotates, eventually pass an oil port. In other words, the face seals 801 each have their own lubrication channels located in each housing side 201C, 201D. Furthermore, the face seals 801 and the intake port 259 and exhaust port 265 are constructed so that the face seal 801 is never exposed to the fixed ports 259, 265—this prevents oil from escaping through the ports. The oil not only serves the purpose to reduce the wear and cooling of the seals, but may assist in preventing leaks.

The motion of the rotor 202 is defined by eccentric shaft 210 and a pair of synchronization gears: a pinion gear 212 fixed to the rotor 202 (the shaft axes passes through this pinion without contacting it), and an internal ring gear 211 fixed to one of the intake cover 201C. The internal ring gear 211 has a 3:2 mesh with the pinion 212.

The shaft 210 has an eccentric 210B with eccentricity e. Some embodiments include a bearing placed between the eccentric part of the shaft 210 and the rotor 202. Other embodiments, such as in FIG. 30 for example, omit such a bearing all together, by having a shaft 3210 attached to the rotor 3202 and having input/output shaft eccentrically support the rotor on the hydrodynamic bearings—these are capable of much higher loads.

The operation of the intake ports 259, exhaust ports 265, the intake passageway 261 and the exhaust passageway 270 may be further understood with reference to FIG. 7(*a*) and FIG. 7(*b*), which include two views of circumferential body 201A, along with the intake cover 201C and the exhaust cover 201D. In FIG. 7(*a*), the rotor 202 is aligned with one of the intake ports 259 in the intake cover 201C, creating an intake path by which air (a "fresh charge") 710 enters an expanding working chamber 711. The air passes through the intake port 259 and enters the intake passageway 261 in the rotor 202. The air passes through the rotor 202 and exits through the radial face 202R of the rotor 202, into the working chamber 711. As the rotor 202 turns, the working chamber 711 expands, drawing in the air.

As the rotor 202 continues to turn, the opening of the intake passageway 261 will eventually pass the peak 206. At that angle of rotation, the opening in the intake passageway 261 will be eclipsed by the peak, so that the intake path or conduit ceases to exist. At that angle, the compression chamber is established, and in fact, at that angle the compression chamber is at its maximum volume (V1).

At the rotor angle shown, FIG. 7(*a*) also schematically illustrates the opening from the exhaust passageway 270 into the radial face 202R of the rotor 202 in an adjacent lobe-receiving region 220. Exhaust gas passes from the working chamber 250 into the exhaust passageway, and ultimately pass to the environment external to the engine 200 via exhaust ports 265 in the exhaust cover 201D. This can be helpful for compression ignition, as it circumvents the need for exhaust gas recirculation and thus reduces the emissions. For spark ignition operation, the check valves could be installed to eliminate the cross-talk, which could be valuable for a spark ignition mode of operation, for example.

As indicated in the embodiment of FIG. 7(*a*), the intake passageway 261 and the exhaust passageway 270 may, at some angle or a range of angles of the rotor 202, both open into the working chamber from which exhaust gases are leaving the engine, resulting in a mixture of fresh air and exhaust gases.

An alternate embodiment 750 is schematically illustrated in FIG. 7(*c*). In this embodiment 750, the aperture 751 in the radial face 202R of the rotor 202 is smaller than the corresponding aperture in FIG. 7(*a*). As such, the intake passageway 261 does not open to both the intake chamber and exhaust chamber, as in FIG. 7(*a*). A similar small aperture leads from the exhaust chamber to the exhaust passageway, but is not shown in FIG. 7(*c*) because it is not visible in the illustrated orientation of the rotor 202. As such, some embodiments include an intake passageway and an exhaust passageway configured such that the intake and exhaust passageways to not simultaneously (or at a given angle of rotation or for a range of angles of rotation) open into the same working chamber, and such that neither the intake passageway nor the exhaust passageway opens to more than one working chamber at a time.

FIG. 7(*d*) schematically illustrates air flow in another embodiment, which includes a view of housing body 201A, along with the intake cover 201C and the exhaust cover 201D. The intake passageways 261 are in communication with an expanding working chamber 250, creating an intake path by which a fresh charge 710 enters the working chamber 250. The air passes through the intake port 259 and enters the intake passageway 261 in the rotor 202. The air passes through the rotor 202 and exits through the radial face 202R of the rotor 202, into the working chamber 250. As the rotor 202 turns, the working chamber 250 expands, drawing in the air. Similarly, FIG. 7(*d*) schematically illustrates the flow of exhaust gases 765 (e.g., combustion byproducts in the form of burnt gasses) out of the working chamber through exhaust ports 265.

Seal Grid

During operation of an engine, including engine 200 for example, working medium under pressure will seek to escape from the working chambers via any available route. Accordingly, engines contain seals to prevent or at least hinder the escape of working medium from various working chambers. To this end, the seals within an engine may be known as a "sealing grid" or "seal grid." A sealing grid system for rotary engines is defined as a system of seals sealing flat, axial surfaces of the rotor to flat, axial surfaces of the housing (covers), called side seals or face seals, and radial surfaces of the rotor to radial surfaces of the housing, called peak seals. In some embodiments, the sealing grid may include buttons, which seal between the side seals and the peak seals. A sealing grid system is constructed such that, together with rotor and the housing, the working chamber during compression, combustion and expansion is substantially closed such that high pressure working medium does not leak to adjacent low pressure regions, including intake and exhaust. In practice there will always be a leak path due to manufacturing tolerances as well as a need to leave a gap between the members of the grid themselves or members of the grid and rotor or housing to accommodate thermal expansion of the components; if designed correctly, these leaks could be minimized.

Consider, for example, the Wankel rotary engine—the only commercially successful rotary engine. The engine's geometry was well-known before Wankel. Wankel's contribution was that he developed a theoretical sealing grid, which made this engine technically and commercially feasible.

One embodiment of a sealing grid is schematically illustrated in FIG. 8(a), although other figures described above also illustrate portions of various embodiments of a sealing grid. The sealing grid in FIG. 8(a) includes a face seal 801, a peak seal 251A, and a button seal 810. Together, these seals prevent working medium from escaping from a working chamber into an adjacent working chamber, or to the environment external to the engine 200. For example, the peak seal 251A prevents leakage of working medium from one working chamber to another across the radial surface 202R of the rotor 202. The face seal 801 prevents leakage of working medium from a working chamber across the axial face 821A of the rotor 821.

Figure 1C:
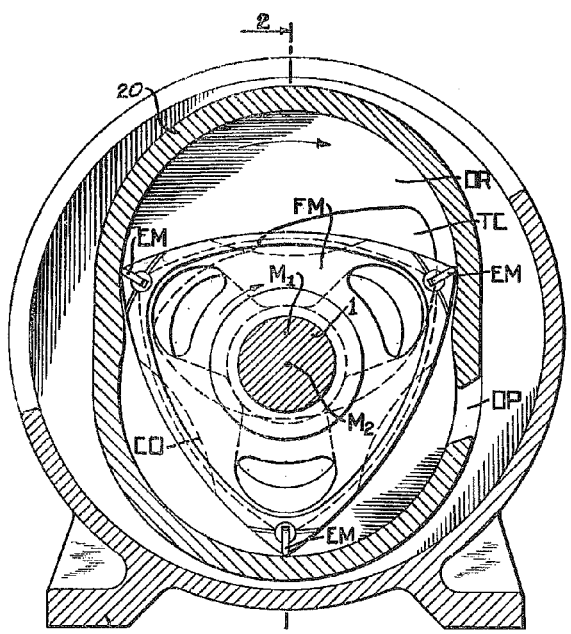
Figure 1D:
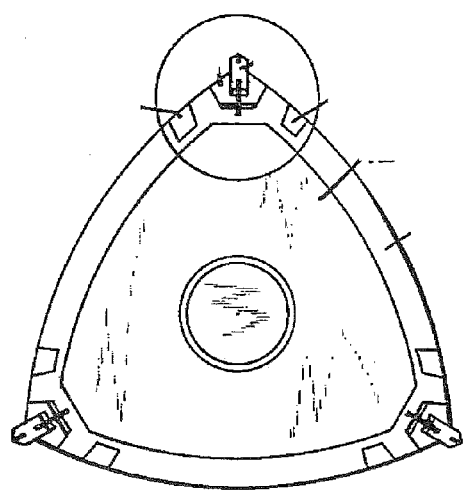

With the exception of face seals, all other members of the sealing grid (e.g., peak seals and button seals) are stationary. This is a great advantage over Wankel, in which seals (e.g., apex seals on the rotor travel with the rotor; see FIGS. 1(c) and 1(d)). In contrast to Wankel, because elements of the sealing grid are stationary, it is possible to supply them with lubricant directly (for example, through oil ports in a side cover), rather than via injecting/mitering the oil into the intake port as in a Wankel engine. This will significantly reduce oil consumption and the engine's emission as compared to a Wankel engine.

While face seals are traveling with the rotor, they are also being constantly supplied with oil through dedicated oil ports within the covers and since seals are never exposed to intake nor exhaust ports, the oil leakage from these seals is minimized if not eliminated completely. The face seal themselves could have one or more small grooves, channels, or cross hatch that can hold oil, such oil supplied from oil ports located within the covers next to button seals. The shape of the face seals is generated by equation for cycloidal curve in such a way that the neutral plane of the seal always passes through three (for 3-lobe housing) points in the cover, regardless of rotor angular position. Any one or all of these points determine the location of oil ports. Thus, the face seals will be continuously exposed to the oiling ports, while oiling ports are only exposed to the face seals, so that no oil leakage will occur. Furthermore, the face seal is always adjacent to virtual rollers corresponding to optional button seals. This enables optional button seals, occupying the space of the virtual button roller, to be placed between the face seal and the roller/seal. The button seal, as stated above, is stationary and rides on the flat surface, or landing, of the rotor, closing gap between face seal and the peak seal.

Face Seals

In the embodiment of FIG. 8(a), face seal 801 is set back from the edge 821E of the rotor 202, where the axial face 202A of the rotor 202 meets the radial surface 202R of the rotor 202. The portion of the axial face 202A of the rotor 202 between the edge 821E and the face seal 801 may be known as the landing 811. In the embodiment of FIG. 8(a), the landing may have a width of one-tenth ($1/10$) of an inch, for example. As such, the seal grid of FIG. 8(a) includes a button seal 810, which prevents leakage of working medium across the axial face 202A of the rotor 202 between the peak seal 251A and the face seal 801. Embodiments of each of these seals are described in more detail below.

Each of the face seals described herein may be of a cast iron material. However, other suitable materials for use as a face seal include, for example, steel alloys and other alloys. Generally, a face seal, and the material from which it is made, should have sufficient strength to perform under the demanding environments of an internal combustion engine as described herein, and also have low friction, low wear, and a low coefficient of thermal expansion. A face seal should also have some capacity to hold lubricant (e.g., oil), and should have high thermal conductivity.

While FIG. 8(a) schematically illustrates an embodiment of a face seal 801 on the intake face 202A of the rotor 202, another face seal is disposed on the exhaust face of the rotor 202- see, for example, face seals 801 in FIG. 6. These face seals 801, in conjunction with the opposing intake cover 201C and exhaust cover 201D, respectively, operate to hinder or prevent the escape of working medium across the faces of the rotor 202. To this end, the face seals 801 are disposed on the rotor 202 such that the face seals 801 are never exposed to the intake ports 259 or exhaust ports 265 at any angle of rotation of the rotor. Exposing the face seals 801 to the intake ports 259 or exhaust ports 265 would mean that the seals are exposed to the environment outside of the engine 200, and could result in the loss of any lubricant on the seals. For example, FIG. 9 schematically illustrates the location of a face seal shown against the intake ports 259 of an intake cover 201C. As shown, at no point does the face seal 801 appear within or through any of the intake ports 259 or exhaust ports 265.

Figure 11A:
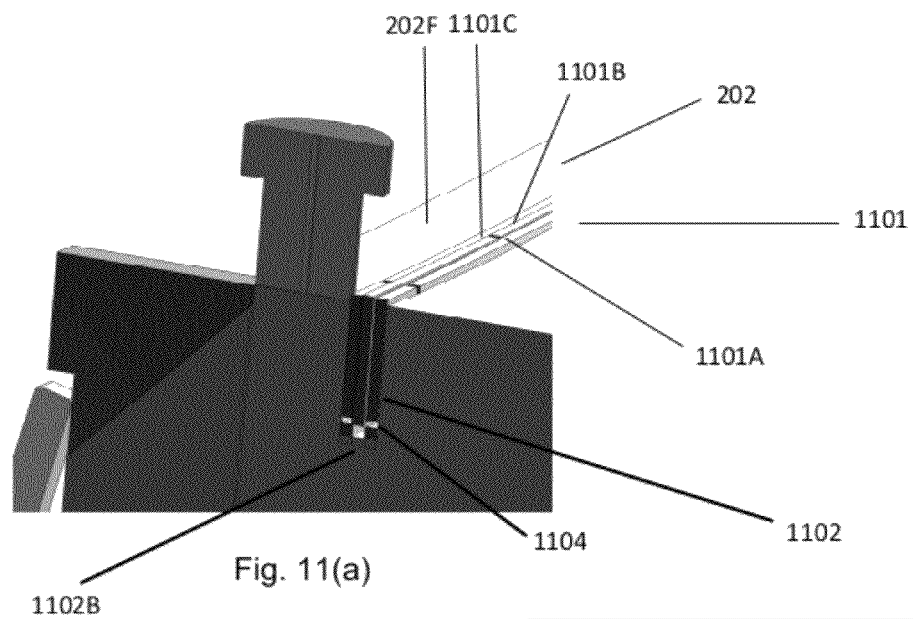
FIGS. 11(a)-11(c) schematically illustrate embodiments of a face seal.

An embodiment of a face seal 1001 is schematically illustrated in FIGS. 10(a) and 10(b). A face seal 1001 may be a continuous band of material as in FIG. 10(a), or may include several portions of material coupled together as in FIG. 10(b). Some embodiments 1001 includes multiple bands, as schematically illustrated in FIG. 11(a), for example, in which face seal 1001 includes three bands within a recess 1102 in rotor 202: inner band 1101A, outer band 1101C and middle band 1101B.

Figure 11B:
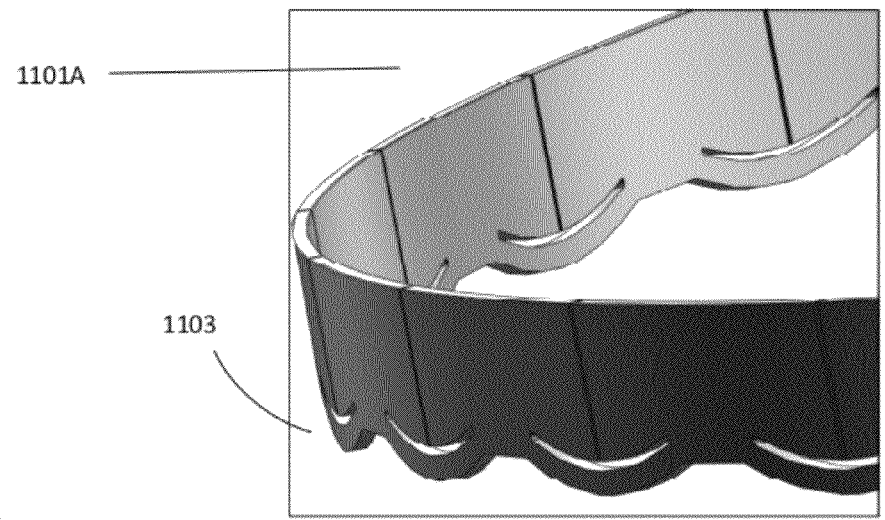

An illustrative embodiment of one such band 1101A is schematically illustrated in FIG. 11(b). Band 1101A includes spring portions 1103 that, when installed in the recess 1102 in rotor 202, exert force against the bottom of recess 1102B so as to bias the band 1101A in an axial direction from the face 202F of the rotor 202, and thereby to bias the face seal 1101A against an opposing intake cover or exhaust cover. This is helpful in creating an initial contact of the seal with the cover. In operation, the air passes through the channel between the outer edge of the groove 1102 and the seal 1101A, gets under the seal 1101A and generates an axial movement of the seal in the direction of, and into contact with, the corresponding cover, generating a seal for high pressure operation. This is called gas actuated seal.

Figure 11C:
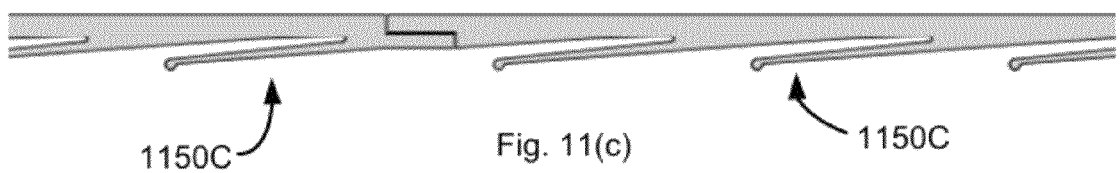

An alternate embodiment of a segmented band 1150 is schematically illustrated in FIG. 11(c). Segmented band 1150 includes a several segments (1150A, 1150B) that are joined to form a band, and also includes spring portions 1150C.

Alternate embodiments of face seals are schematically illustrated in FIGS. 12(a)-12(g). In one embodiment, the face seal 1201 is disposed at a chamfered or beveled edge 1203 of rotor 1202. As such, face seal 1201 has a roughly triangular cross-section. This configuration eliminates the need for a button seal, since there is no landing space on the rotor 1202. In these types of seals, there is no groove, and as such, there is no channel between the rotor and the seal; gas cannot penetrate under the seal. However, the seal is still considered to be air-activated, since the radial surface may be exposed to gases, and thereby receives the force that is converted by the chamfered edge of the rotor into axial force and, therefore, axial movement of the seal toward the cover, thus facilitating the sealing function.

Figure 12D:
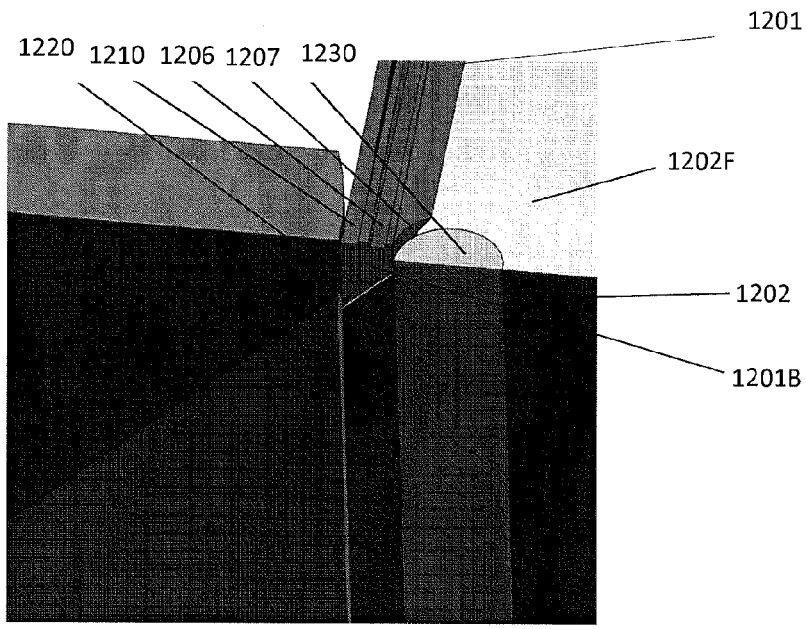

The seal above may have an axial (flat) surface 1210 in FIG. 12(d)) that could be a very short distance away from the surface of the cover. This creates a gap for gas to pass through and creates pressure/force in a direction opposite to the above-mentioned axial force. By varying the surface area of this gap enables control of the axial force, which may serve as an unwanted brake, thereby reducing friction between face seal and the cover.

If the chamfered surface 1201B of the face seal 1201 has the same chamfer angle as the wedge seal 1220 the small part of the face seal could be designed to move together with the wedge seal 1220, thus reducing or totally eliminating the gap between face seal 1201 and wedge seal 1220.

A post 1230 is disposed in the rotor 1202 adjacent to the face seal 1201 and serves to prevent the face seal 1201 from riding up the beveled edge 1203 and over the axial face 1202F of rotor 1202. A wedge seal 1220 is disposed on the other side of face seal 1201, opposite the post 1230, and serves to prevent the face seal 1201 from moving away from the rotor 1202.

FIG. 12(d) also schematically illustrates the top profile 1205 of face seal 1201, which includes grooves or channels 1206 that retain lubricant supplied to the face seal 1201. An alternate approach is to apply a cross hatch pattern to the face seal surface.

Figure 12E:
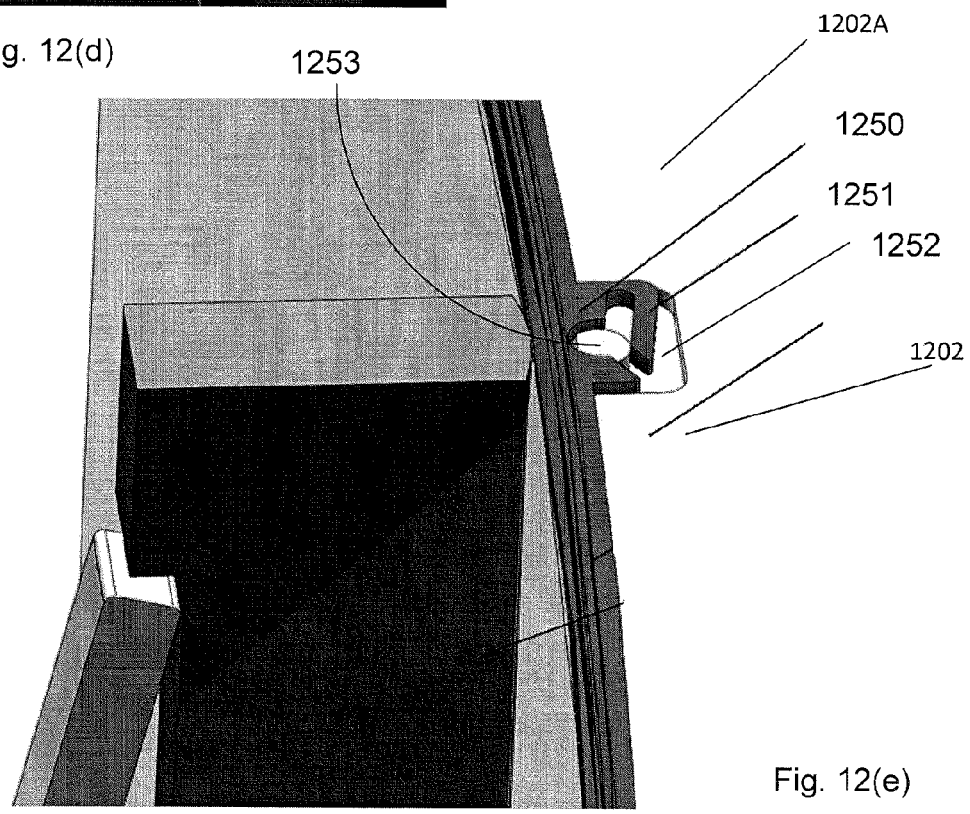

An alternate structure for holding a face seal 1250 to the rotor 1202 is schematically illustrated in FIG. 12(e). In this embodiment, face seal 1250 includes a latching spring-arm 1251 extending from the face seal 1250 parallel to the axial surface 1202A of the rotor 1202. The spring-arm 1251 extends into a cavity 1252 on the rotor 1202, and around a pin 1253 within the cavity 1252. The pin 1253 is thereby used to enable a spring-arm 1251 to pull the face seal 1250 inwardly toward the rotor's center. This will create a necessary preload condition to push the face seal against the housing side, thus enabling the start of operation of the seal. Under pressurized condition, the gas pressure will take over.

Figures 12F, 12G:
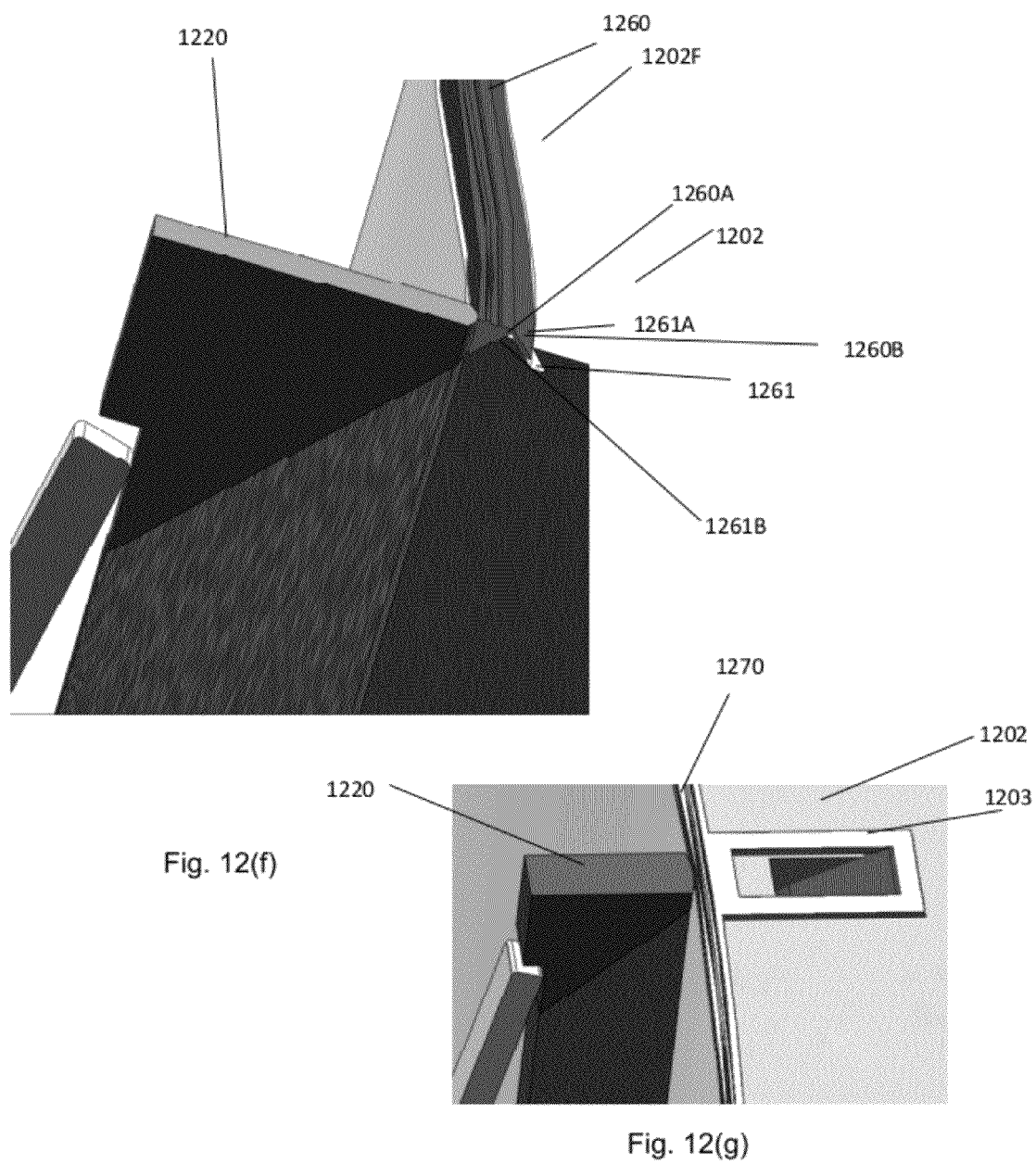

Still another approach to holding a face seal 1260 to the rotor 1202 is schematically illustrated in FIG. 12(f). In this embodiment, the beveled edge 1261 of the rotor 1202 includes a second, opposing beveled area 1261A, such that the edge has a peak 1261B. The face seal 1260 includes a notch 1261A with a cross-section configured to mate with the peak 1261B. A tongue portion 1260B of the face seal 1260 engages the opposing beveled area 1261 so as to prevent the face seal 1260 from riding away from the edge 1261 and over the axial face 1260F of the rotor 1202. A wedge seal 1220 secures the opposite side of the face seal 1260.

Yet another alternate structure for holding a face seal 1270 to the rotor 1202 is schematically illustrated in FIG. 12(g). Again, as with previous configurations, the function of the latches and holding mechanisms 1203 is to provide an initial preload on the seal.

Alternate approaches to face seals are schematically illustrated in FIGS. 13(a)-13(g). In a first embodiment, a wire seal 1301 resides in a groove 1302 disposed in the rotor 1303. When the engine is cold, as in FIG. 13(a), the wire seal 1301 rests between the rotor groove 1302 and the side cover 201C, which may be an intake cover or an exhaust cover, for example. The wire seal 1301, which could have a circular or triangular cross-section, makes physical contact with both the rotor 1303 and the cover 201C, so as to form a seal. When the engine is hot, as in FIG. 13(b), the components expand due to thermal expansion. As such, the gap between components shrinks yet the wire 1301 still makes physical contact between the rotor 1302 and cover 201C.

Any high-temperature steel or tungsten wire could be used for the wire seal 1301. The leakage path for cold start conditions is calculated at 0.11 $mm^2$ in cross-section for a 0.020" wire diameter; for hot operating conditions—the cross-section is at 0.03 $mm^2$. There exists four places for the leakage path—2 sides of the rotor×2 places by the apex seals; therefore total leakage path for this type of side seals is 0.33 $mm^2$ for cold start and 0.12 $mm^2$ for hot operating conditions. This is to be compared with ~4 $mm^2$ leakage area for Wankel engines [see Performance and Combustion Characteristics of Dire-Injection Stratified-Charge Rotary Engines, Nguyen, Hung Lee, N.A.S.A. 1987).

In another embodiment, illustrated in FIGS. 13(c) and 13(d), the groove 1302 may be at the edge 1305 of the rotor 1303. In this embodiment, the wire seal 1301 is held in place by wedge seal 1220.

Figure 13E:
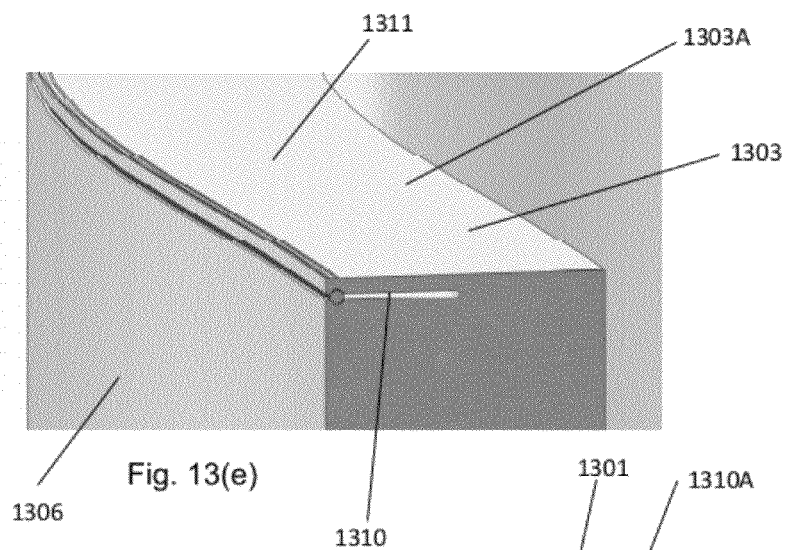
Figure 13F:
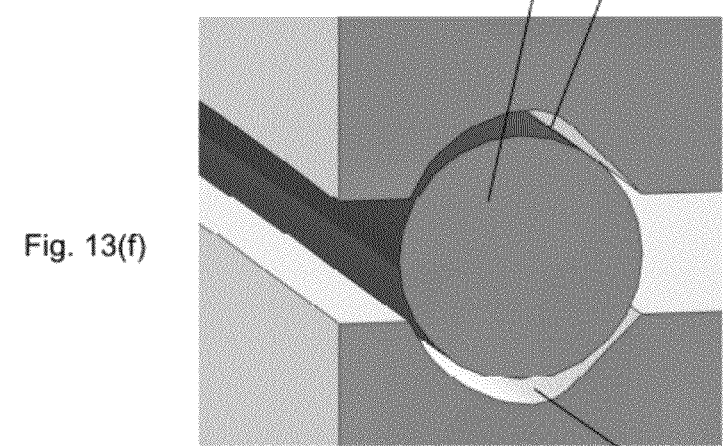

In another embodiment, illustrated in FIGS. 13(e) and 13(f), the rotor 1303 includes a cavity 1310 below its axial face, which cavity opens to the radial surface 1306 of the rotor 1303. The arrangement produces a cantilevered beam 1301 in the axial surface 1303A of the rotor 1303, which beam 1311 can flex slightly in the axial direction. A wire seal 1301 is disposed in the cavity, between two chamfered surfaces 1310A, 1310B, and serves to bias the beam 1311 in the axial direction when gas exerts pressure on it, towards a facing cover (such as an intake cover or exhaust cover, for example). In some embodiments, the cantilever part 1311 of the seal could be completely detached from the rotor.

Figure 13G:
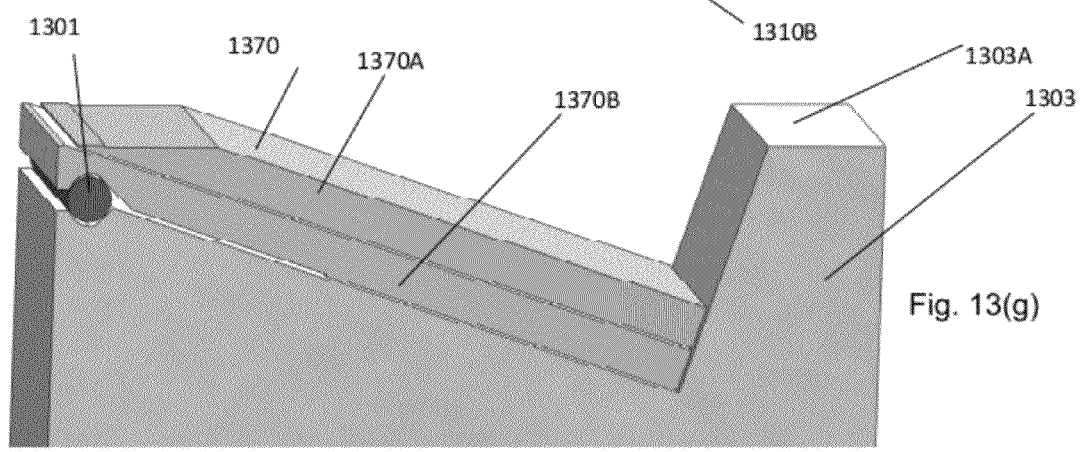

An alternate embodiment is schematically illustrated in FIG. 13(g). It is very similar to the embodiment described above, except the face seal 1370 could be angled with respect to the axial surface 1303A of the rotor 1303. Such an embodiment enables several "layers" 1370A, 1370B of face seal be placed on the rotor 1303. Oil will collect between the "layers" and will aid in sealing and lubrication.

Figure 14:
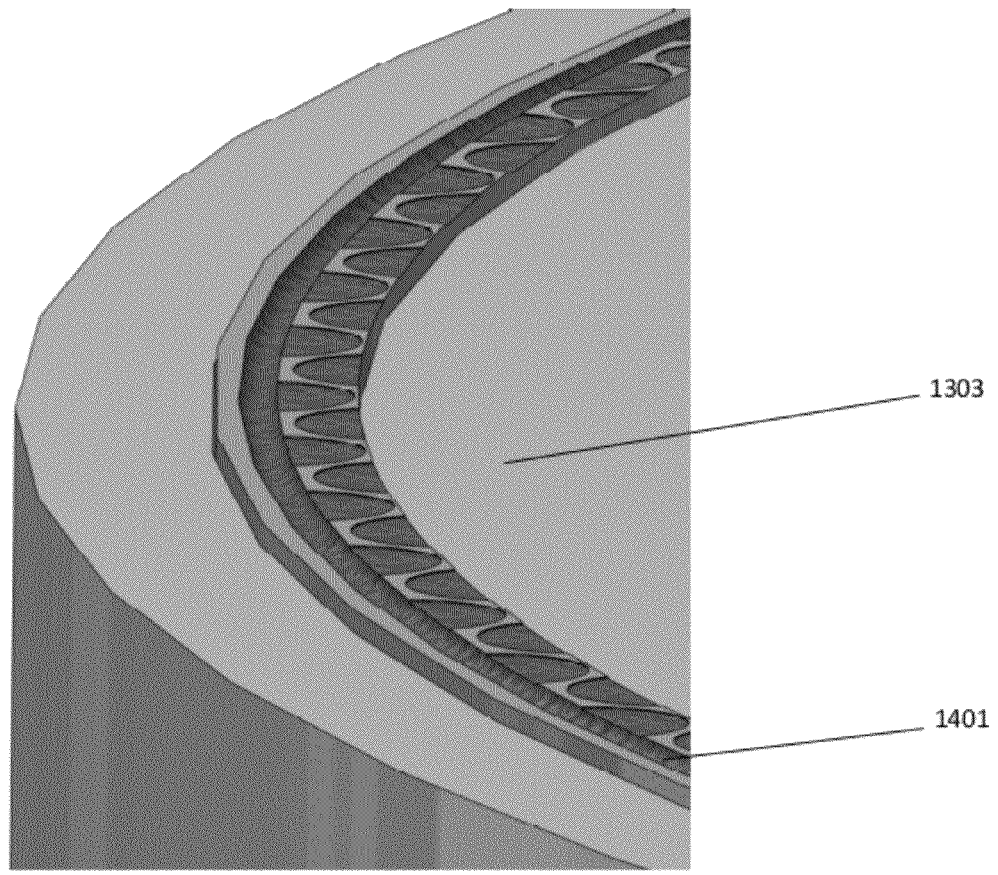
FIG. 14 schematically illustrates an embodiment of a face seal.

An alternate embodiment is schematically illustrated in FIG. 14, and includes a metal face seal 1401. In this embodiment, the metal face seal 1401 reduces, but does not entirely span, the gap between the rotor and an adjacent cover. For example, in some embodiments, the microscopic gap between seal and the cover may still be larger than the size of the gas molecules by 3 orders of magnitude.

To facilitate a seal, an oil film is provided to fill the aforementioned gap. Due to the capillary forces the oil will fill the gap completely and will resist the pressure from the working medium (e.g., gases) within the engine. In addition, the oil film will drastically decrease the friction between the seal and the cover, and thereby enhance the cooling of the engine.

As mentioned above, one beneficial feature of the cycloidal-rotor geometry of engine 200 is that, for at least in three points on the cover, lubrication ports (holes) may be disposed such that they will be always above the face seal. Also, the intake/exhaust ports on the covers are placed in such a way that side seals never interfere with these ports. As such, this geometry enables the creation of a permanent oil layer on the top of the face seals. To enhance this layer the top surface of the face seal can have oil grooves and/or pads of various designs to create elastohydrodynamic lubricating conditions required to decrease the friction between a face seal and an adjacent cover.

Rollers

As described above in connection with other embodiments, each peak 1505 in the circumferential body 1501 of a housing 1502 has a peak seal, but alternate embodiments, schematically illustrated in FIGS. 15(a)-15(c), include rollers 1503 at each peak 1505. In such embodiments, the cylindrical surface 1503A of the roller 1503 sealingly contacts the radial surface 1511R of the rotor 1511; in other words, the contact creates a seal between the roller 1503 and rotor 1511. Each roller should have a radius equal to the radius of the theoretical roller (Rr) corresponding to the rotor and aperture of the circumferential body.

In the embodiment of FIGS. 15(a)-15(c), the roller 1503 is disposed within a roller cavity 1510, which is filled with oil 1520 or other lubricant to lubricate the roller 1503, and also to bias the roller 1503 in a radial direction to engage the rotor 1511. One or more wipers 1530 are disposed in the roller cavity 1510 to contain the lubricant within the roller cavity 1510 and to help secure the roller 1503 within the roller cavity 1510. A button seal 1535 and face seal 1540, as discussed above, complete the seal grid in this embodiment.

Figure 16A:
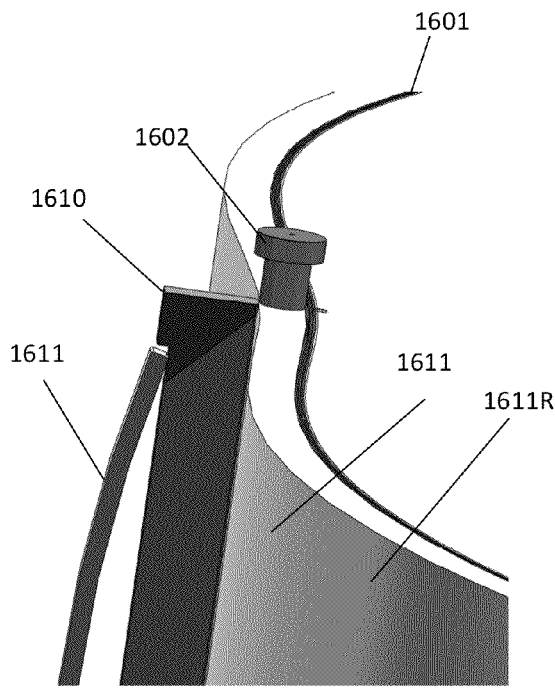
FIGS. 16(a)-16(d) schematically illustrate embodiments of components of a sealing grid.
Figure 16B:
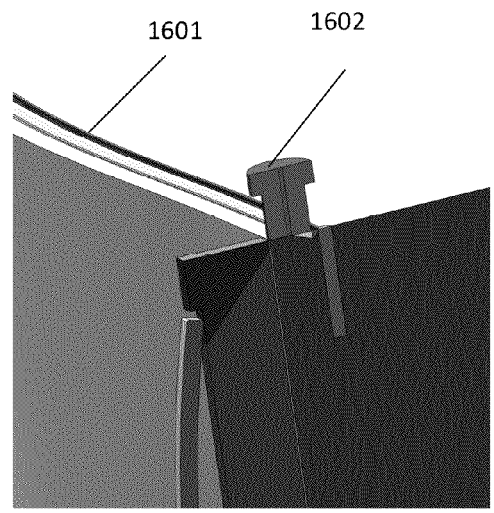
Figure 16C:
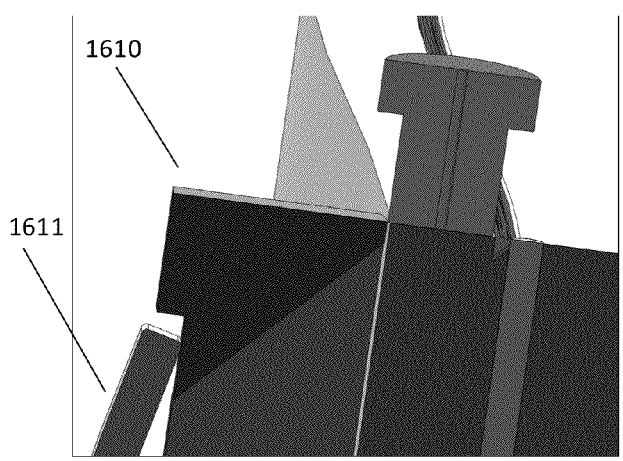
Figure 16D:
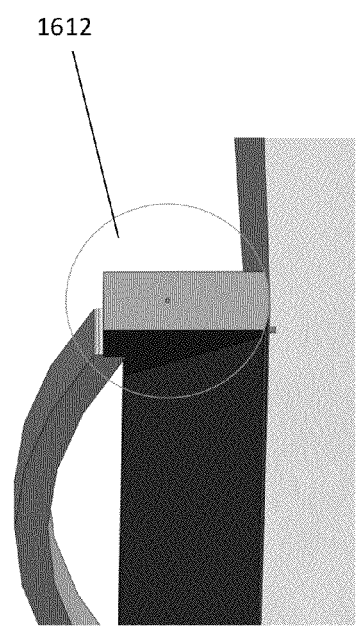

Alternate embodiments of a seal grid are schematically illustrated in FIGS. 16(a)-16(d), and include a face seal 1601 and button seal 1602 as discussed above. These embodiments, however, also includes a wedge seal 1610. The wedge seal 1610 is disposed in a peak (i.e., it is a peak seal), and is biased against the circumferential housing (omitted for clarity) by spring member 1611, so as to engage the radial surface 1611R of the rotor 1611. FIG. 16(d) schematically illustrates an alternate embodiment of the wedge portion 1612 of a wedge seal 1610.

Peak Seals

A variety of peak seals are available for use in various engine embodiments. As shown in FIG. 8(a), for example, the peak seals are disposed on the housing 880. In that embodiment, the peak seal 251A is disposed in a peak seal channel 825 at the peak 822. In some embodiments, the peak seal may be biased in a radial direction towards the rotor 202 so as to engage the rotor 202.

To this end, each peak seal may include a spring that engages the peak seal channel 825, resulting in a radial force on the peak seal in the direction of the rotor 202. Two such embodiments are schematically illustrated in FIG. 17 and FIG. 18. The peak seal 1701 includes a peak seal body 1702 and a spring member 1703. Similarly, the peak seal 1801 includes a peak seal body 1802 and a spring member 1803. In other embodiments, a peak seal may be biased within the peak seal channel by oil or other liquid disposed in the peak seal channel.

Figures 19A, 19B:
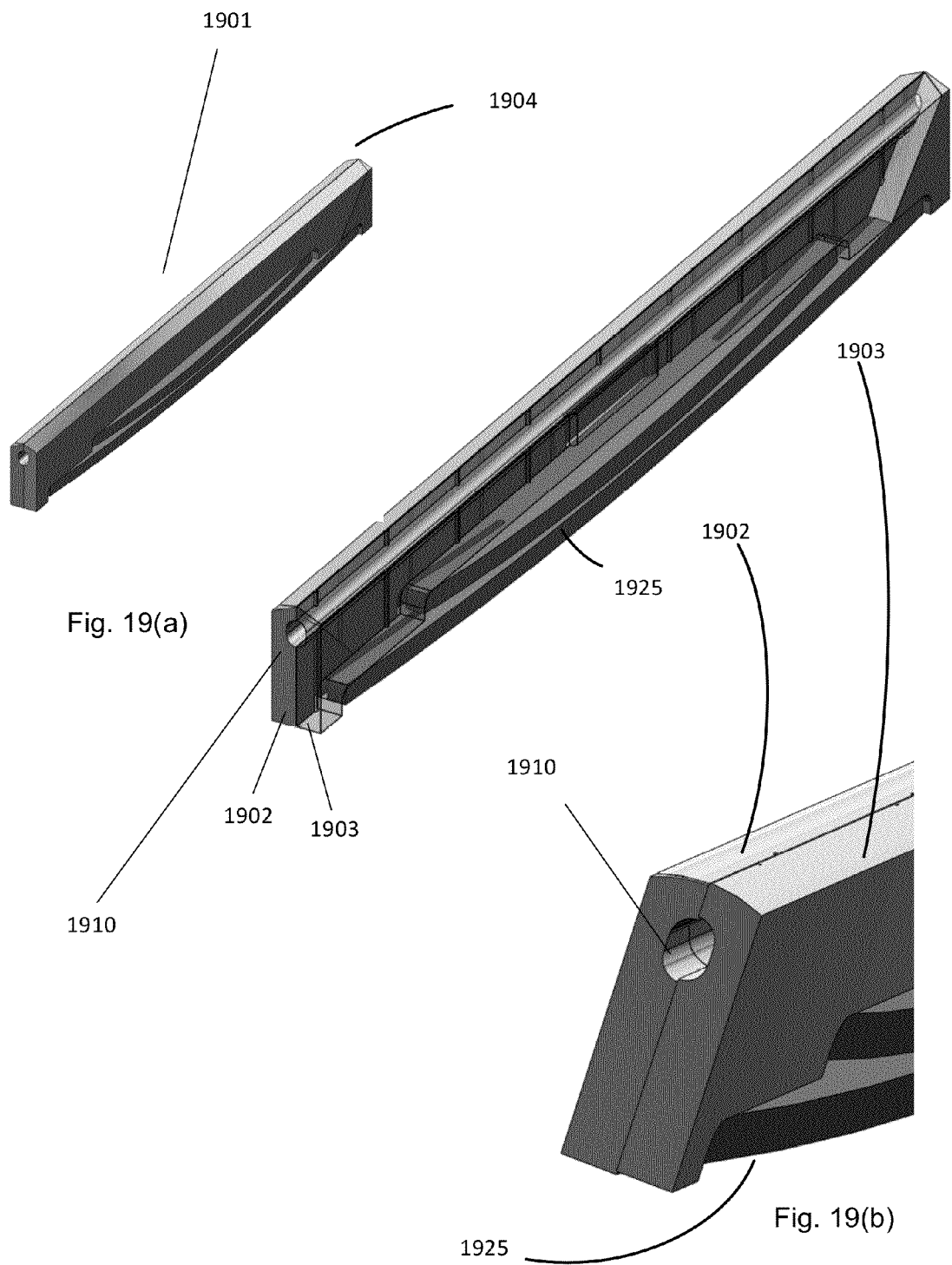
FIG. 19(a)-19(b) schematically illustrate an embodiment of a peak seal.

Another embodiment of a peak seal 1901 is schematically illustrated in FIGS. 19(a) and 19(b). Peak seal 1901 includes two pairs of seal elements 1902 and 1903, arranged side-by-side as shown in FIG. 19(a). Each pair could consist of one small 1903 and one large 1902 segment supported by the split springs 1925. A lubrication channel 1910 between segments provides lubricant (such as oil) to the seal/rotor interface directly. This is distinguishable from prior art rotary engines, which inject oil into the engine's interior to reach seals on the rotor. By supplying oil directly to the seal and seal/rotor interface, less oil is required and less oil is burned in the engine, thereby reducing oil consumption and emissions.

The edges of the peak seals 1902, 1903, where the peak seal meets the rotor, are preferably curved, as schematically illustrated in FIG. 19(b). In some embodiments, the peak seals are curved with a radius of curvature Rr—theoretical roller radius. This will minimize apex seal travel.

Figures 20A, 20B, 20C:
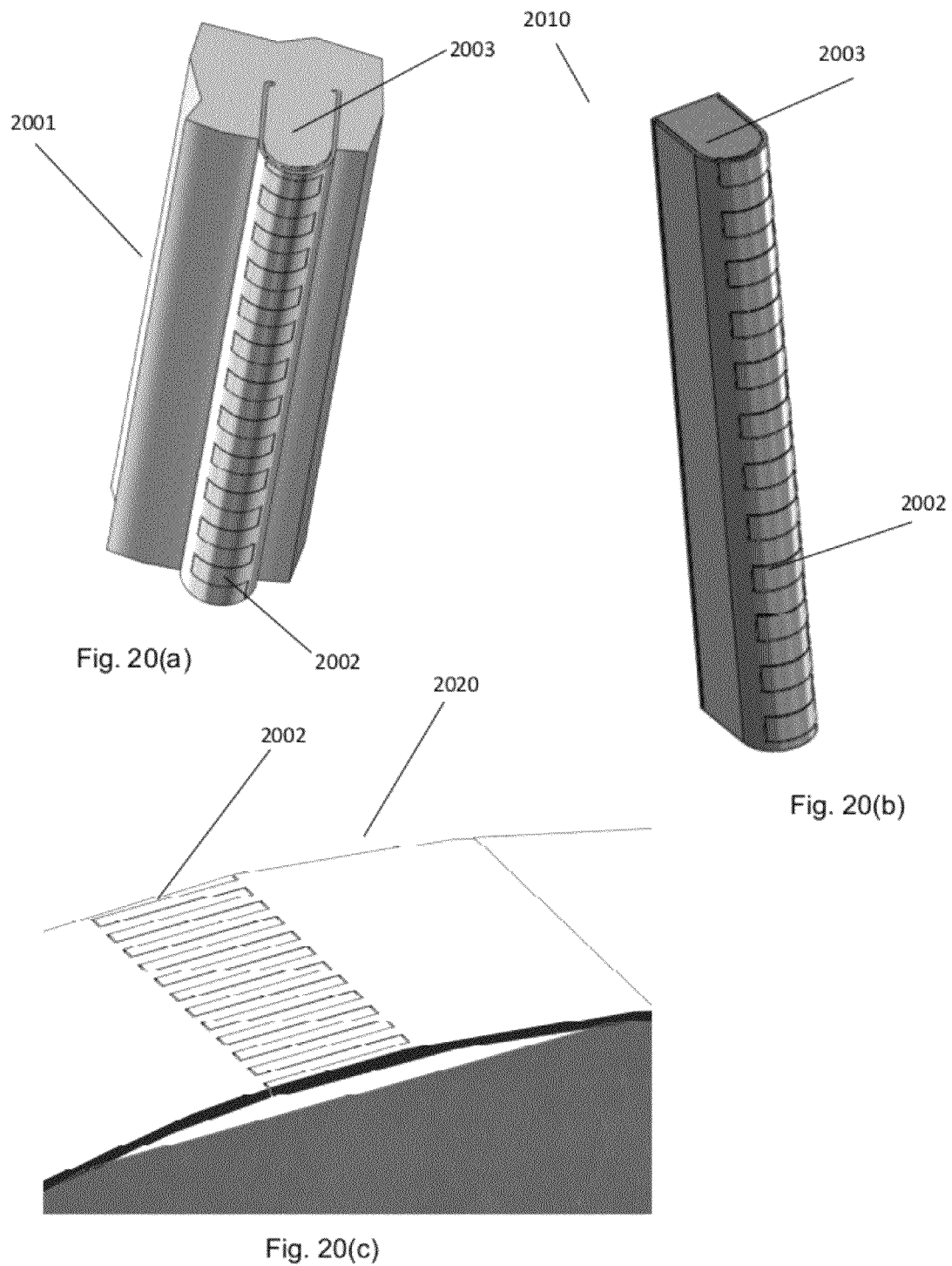
FIG. 20(a)-20(c) schematically illustrate embodiments of a peak seal.

Yet other embodiments of peak seal 2001, 2010, and 2020 are schematically illustrated in FIGS. 20(a)-20(c). These seals are split or perforated 2020 to allow gas to enter below the sealing surface to equalize the pressure from the outside of the seal gas. To minimize the leak the space between the seal and the rotor or the insert should be filled with high-temperature metal wool 2003.

It should be noted, that unlike Wankel apex seals, which require approximately 0.070-0.110 inches of travel for the seals on its rotor (for approximately 100 kW engine), no peak seal in the various embodiments described above travel more than 0.01 inches (0.0254 centimeters) at the most and, in some embodiments, possibly a lot less.

Button Seals

A simple button seal 810 is schematically illustrated in FIG. 8(a), and may be of a known type, such as button seals used in Wankel engines, for example. However, when rotor 202 expands due to heating, the face seal 801, located in a groove in the rotor 202 moves in an outward radial direction. Depending upon the choice of materials and operating temperatures, the face seal 801 may interfere with the button 810. One solution to this problem may be to undersize the button or to allow button to move together with the face seal during thermal expansion of the rotor 202.

Figure 8B:
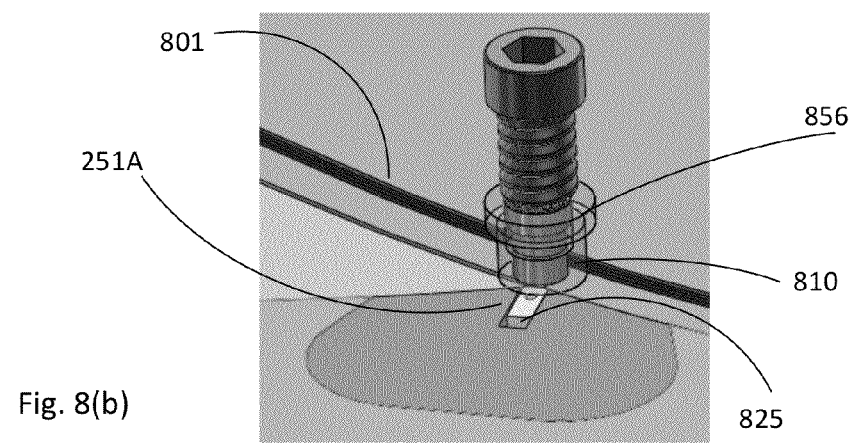

To that end, the button 810 in FIG. 8B is disposed in a button sleeve 856. The button sleeve 856 allows the button 810 to move, slightly, in the radial direction in concert with the thermal expansion of the rotor 202. The button 810 of the button seal 810 has a circular cross-section and a button radius.

Alternate Embodiments

Although embodiments above have been described in the context of a cycloidal rotor, many of the features may be used in a variety of engines.

Figure 21:
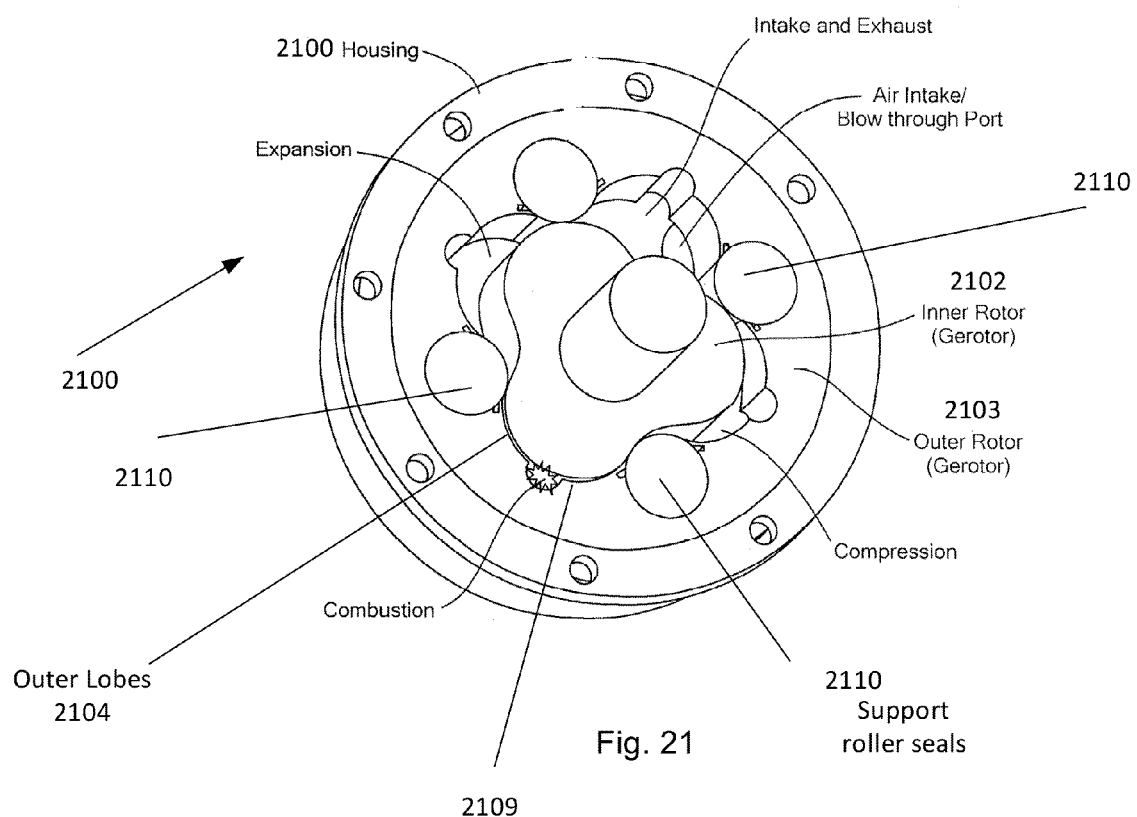
FIG. 21 schematically illustrates an embodiment of a gerotor engine housing and rotor.

For example, a rotary engine compartment 2100 having a three-lobed rotor 2102 is schematically illustrated in FIG. 21 in which both inner rotor 2102 and outer rotor 2103 rotate with constant speed around fixed axes within the housing 2100. The inner rotor 2102 has one less tooth than outer rotor 2103. The rotor 2102 could include a face seal according to the embodiments described above. An alternate embodiment of an engine 2300 with a three-lobed rotor 2301 is schematically illustrated in FIG. 23.

In the embodiment of FIG. 21, a substantially constant volume is created when the inner rotor 2102 engages the corresponding lobes 2104 of the outer rotor 2103.

The inner rotor 2102 rotates and drives the outer rotor. Spring-loaded or oil supported rollers 2110 aid in sealing and reduce friction. Intake ports and exhaust ports are shaped and located in such a way that intake volume is less than expansion volume. A substantially constant volume combustion chamber is possible due to relatively slow rate of volume expansion that exists right after the combustion.

During operation of this embodiment, variable volume cavities, or working chambers, are created by inner and outer rotors and housing covers. Each chamber rotates and in a course of its motion changes the volume from minimal, V2, corresponding to constant volume combustion chamber volume, to a maximum, V4, corresponding to an exhaust volume. Fuel is injected through stationary fuel injectors (not shown) located within covers. The operation is typically according to a HEHC-S cycle where air is scavenged (exhausted and induced), air is compressed, fuel is injected and combusted, and the combustion products are expanded. While a ¾ configuration is shown ⅔, ⅘, etc. configurations are equally possible. This engine may also be operated in a digital mode.

Another embodiment includes a single vane configuration. An engine assembly with such a rotor is schematically illustrated in FIGS. 22(a)-22(c). This embodiment includes a housing (the outer gerotor) 2201 and a single vane 2202 (an inner gerotor) which rotate around its axis while the axis simultaneously rotates (on the eccentric 2203) with respect to the housing 2201. The inner gerotor 2202 uses one less tooth (or lobe) than outer one 2201 has lobe receiving regions. A substantially constant volume is created when the inner gerotor lobe engages the corresponding lobe of the outer gerotor. The rotor 2202 could include a face seal according to the embodiments described above.

The housing 2201 of this embodiment together with the vane 2202, forms 4 (in this instance) variable volume cavities, or chambers, which are analogous to a 4-cylinder piston engine. Vanes 2202 engaging each chamber, in turn, simulate a 4-stroke operation. The working medium will be induced, compressed, combusted, expanded, and exhausted.

The housing will house a constant volume combustion chamber which may be located in housing proper, or in the cover. Conventional poppet valves or spherical valves or disk valve may be used to control timing of intake and exhaust stroke. The valves are not shown in this figure. If constant volume combustion chamber 2220 is located within housing as shown, then cylindrical valves may be employed. These valves would be concentric with the combustion chamber and would rotate exposing the opening from the constant volume combustion chamber to intake or exhaust ports. Having intake valves open while chamber volume is being decreased allows a smaller intake volume than exhaust volume, thus achieving an Atkinson part of the cycle. This embodiment may also be operated in a digital mode of operation and may be used with a fuel injection system.

An alternate embodiment of an engine 2301 with a three-lobed rotor 2300 is schematically illustrated in FIG. 23.

FIG. 24 schematically illustrates another embodiment of an engine 2401, in which a 2-lobed (generally, N-lobed) rotor 2402 is rigidly coupled to an input/output shaft 2403. The shaft 2403 rotates within the housing 2404 together with second 3-lobe (generally N+1-lobed) outer rotor 2405 which is eccentrically mounted with respect to 2-lobe rotor. Side covers contain input/output ports through which fresh charge is blown through in an air-knife fashion—thus accomplishing exhaust and intake at the same time and executing a 2-stroke operation. In addition to the simplicity of kinematics and few moving parts count, this configuration may execute an engine cycle known as the "HEHC" cycle, as described in U.S. patent application publication number US 2001/023814 A1, the disclosure of which is incorporated herein, in its entirety, by reference.

FIG. 25 schematically illustrates yet another embodiment of an engine 2501. In the embodiment, a 2-lobe (generally, N-lobed) inner rotor 2502 is stationary, and a 3-lobe (generally, N+1-lobed) outer rotor 2503 is configured to orbit and rotate about the stationary inner rotor 2502. A drive shaft 2504 with rollers 2505 drives the 3-lobe rotor 2503. This is a kinematically simple configuration that has few moving parts.

Figure 26:
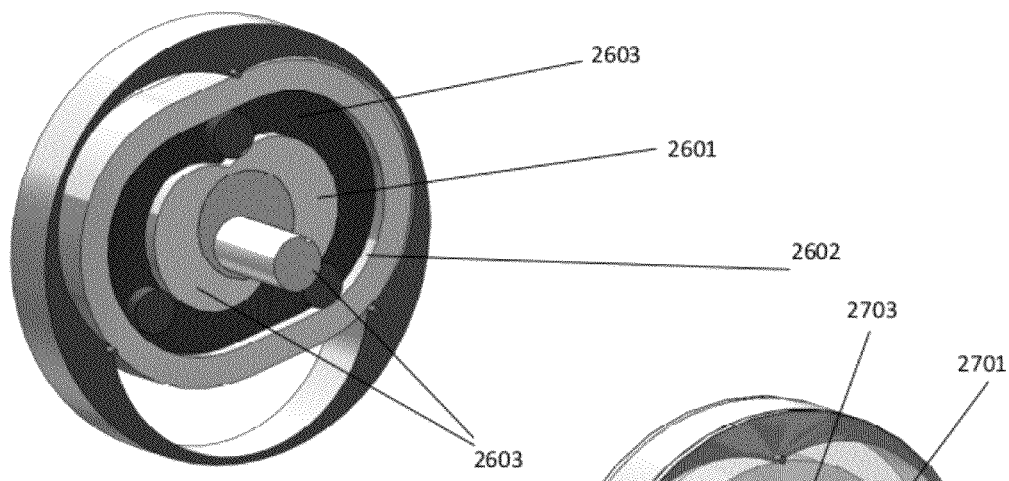
FIG. 26 schematically illustrates an embodiment of a rotor for a rotary engine.
Figure 28:
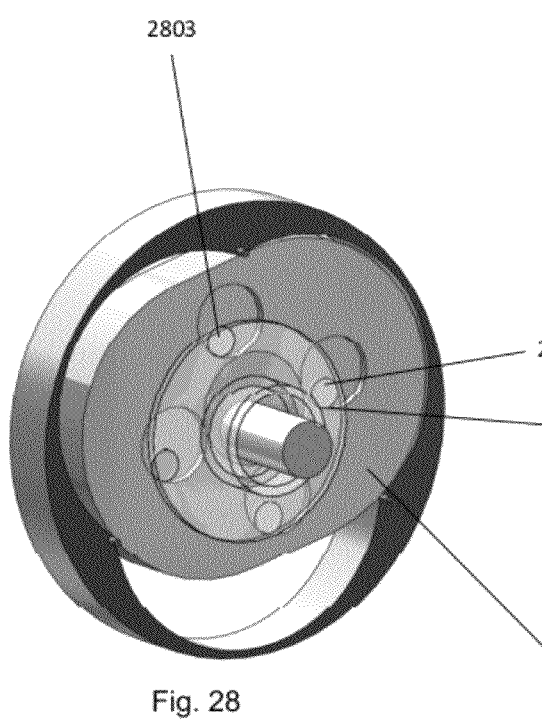
FIG. 28 schematically illustrates an embodiment of a rotor for a rotary engine.
Figure 27:
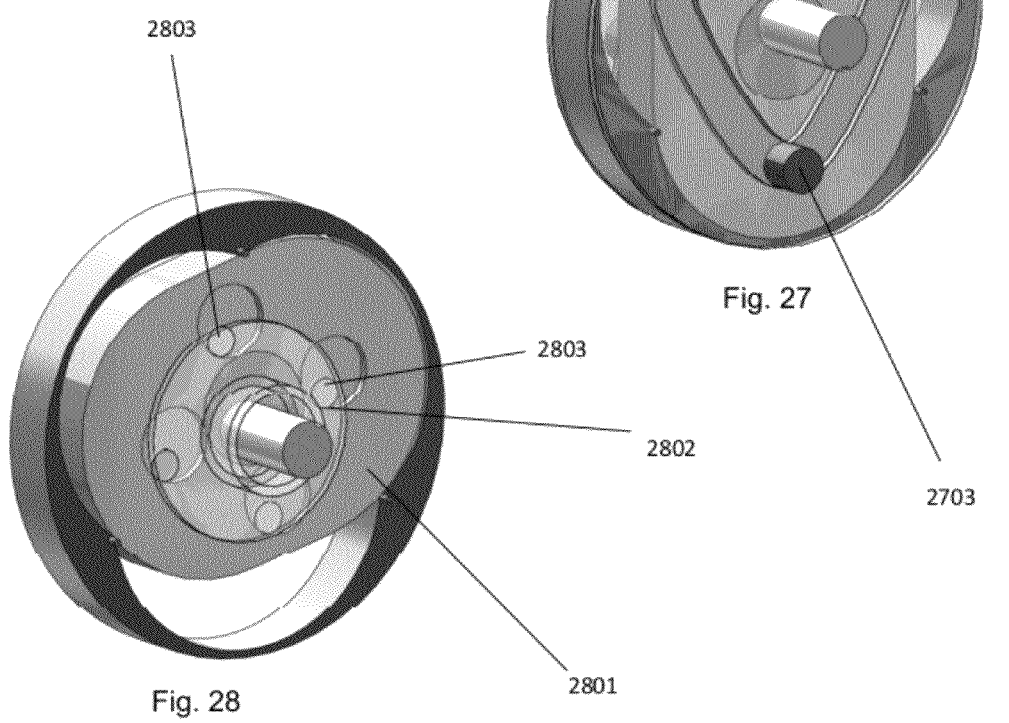
FIG. 27 schematically illustrates an embodiment of a rotor for a rotary engine.

FIG. 26, FIG. 27, and FIG. 28 schematically illustrate embodiments in which the phasing, or synchronization, of rotation and orbiting of the rotor may be achieved without gears.

FIG. 26 schematically illustrates a cam 2601 fixed on a rotor 2602 and three rollers 2603 fixed on the cover (the cover is omitted for clarity). Alternately, a symmetrical configuration—such as two cams/6 rollers, with the second cam on the other side of the rotor, and the fourth, fifth and sixth rollers on the other cover—could be used as well. It should be noted that the cam profile is calculated by the same formulas as for the rotor 2602 itself, except that the forming radius (R) and roller radius (Rr) are different, while eccentricity is the same as that of the rotor 2602.

FIG. 27 schematically illustrates a different configuration where cam 2701 is fixed on cover while two rollers 2703 are fixed on the rotor.

FIG. 28 schematically illustrates an embodiment known as the W-plate. In this embodiment, rollers 2803 are fixed on a separate hub 2802 such that the rollers "pick up" the motion of the rotor 2801 and translate it into purely rotational motion of the hub.

Such an engine has a housing having a working cavity, a shaft with an eccentric portion, a rotor disposed on the eccentric portion and within the working cavity, a hub comprising plurality of rotors, a plate fixedly coupled to the shaft, the plate having several apertures, such that each of rollers passes through a corresponding one of the plurality of apertures. In operation, the rotation of the rotor causes the rollers to circulate around the apertures, such that the eccentric motion of the rotor is transferred to circular motion in the plate.

It should be noted that feature of the embodiments of FIGS. 26-28 could be mixed and matched as desired to avoid possible dead spots. Also, many other embodiments should be obvious to those proficient in the art.

Figure 29A:
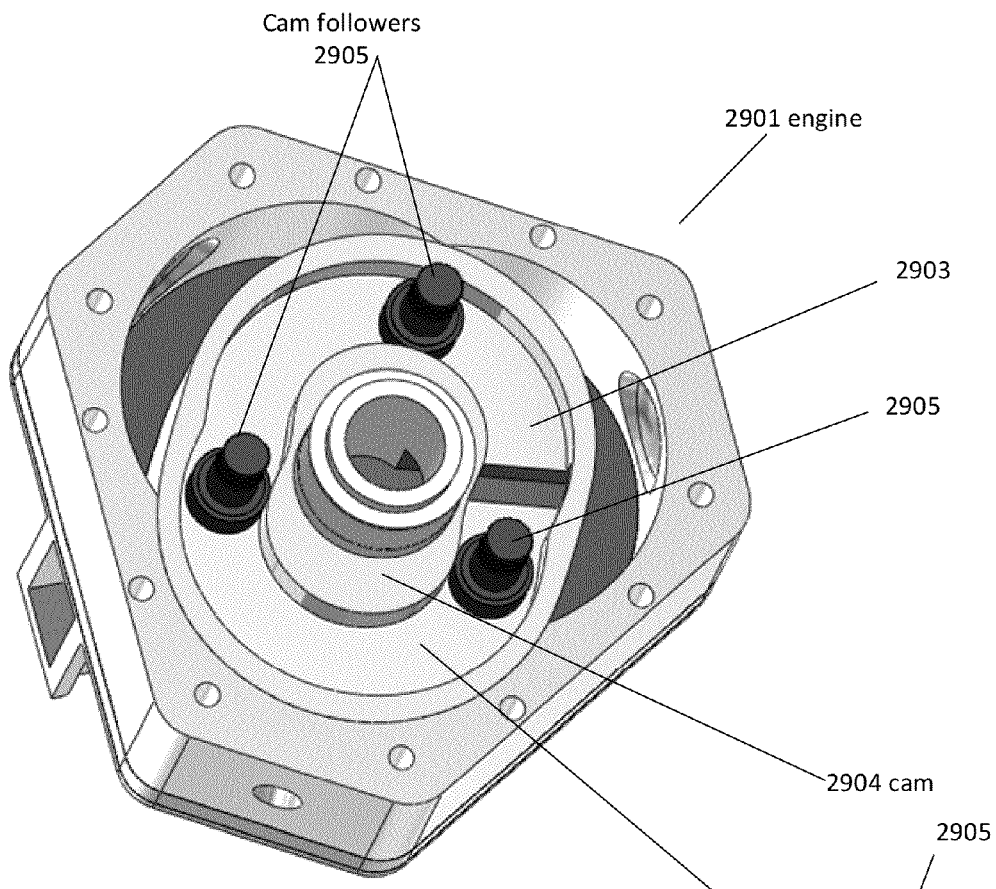
FIG. 29(a)-29(b) schematically illustrates embodiments of a rotor for a rotary engine.
Figure 29B:
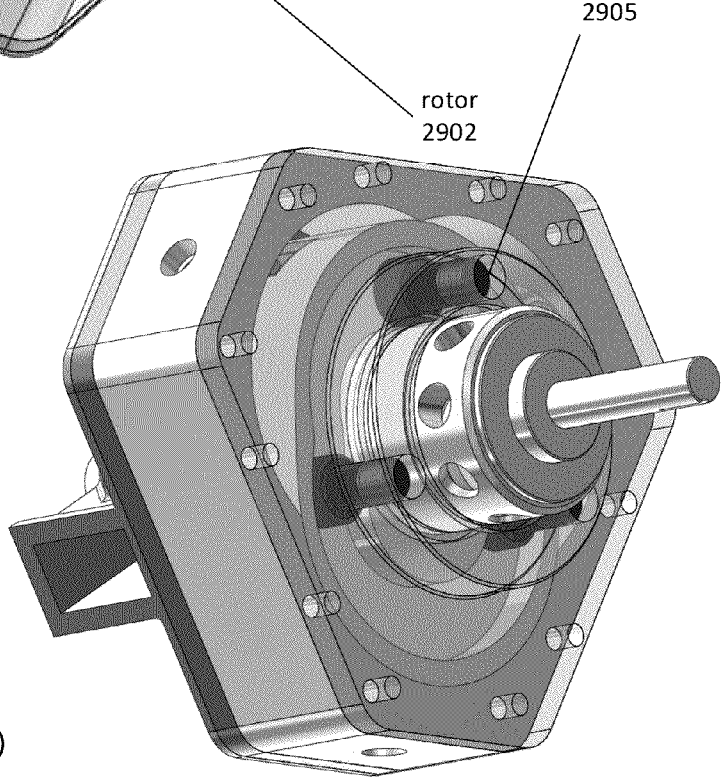

Another embodiment 2901 is schematically illustrated in FIGS. 29(a)-29(b). In cycloid engine, the eccentric takes the most of the load from the gas pressure. The function of the gear pair is to phase the rotor in correlation to the housing. Having a relatively small size pinion limits the size of the shaft and, therefore, the rotor's thickness—leading to mostly pancake-like geometries. FIG. 29 shows an alternative approach, including additional cam(s) 2904 built into the rotor 2902. Three (or six, with three on each side of the rotor) cam followers 2905 rigidly attached to the cover(s) will phase the rotor without the gears. The cam 2904 and cam followers 2905 are described by the same equations and eccentricity as the rotor 2902 itself. Of course, the radiuses R and Rr are different from that of rotor. Additional benefit here is that potentially higher speeds are possible, as three rather large rollers accept the inertial loads as opposed to a single tooth.

An alternate embodiment of an engine is schematically illustrated in FIG. 30(a), FIG. 30(b) and FIG. 30(c). In this embodiment, the rotor shaft 3210 is rigidly connected with the rotor 3202. The rotor shaft 3210 is eccentrically supported by two input/output shafts 3050, one input/output shaft located on each axial direction of the rotor. Each input/output shaft 3050 has two bearing surfaces 3050A, 3050B, where the outer bearing surface 3050A is centered with the center of the engine, and the inner bearing surface 3050B is eccentrically configures, and therefore holds the rotor shaft 3210 eccentrically. Due to the eccentricity of the input/output shafts 3050, these can serve as counterweights to dynamically balance the rotor, eliminating the need for separate counterweights, while allowing bearing and counterweights to be close to the rotor. The input/output shafts 3050 translate the orbiting motion of the rotor 3202 into purely rotary motion. The rotor's synchronization, however, still needs to be made by gears or other means discussed above, for example with the gear 3051. The bearings 3060 may be hydraulic as shown or of other type.

An alternate configuration for gas exchange (intake and exhaust) is also shown in FIG. 30(*b*) and FIG. 30(*c*). This alternative can also be applied, fully or partially (for one of the intake and exhaust porting strategies), to the embodiment shown in FIG. 2. In this embodiment, air intake to the engine, and the exhaust 3111 of working medium from the engine, occurs through the shaft (3210), where the shaft 3210 is rigidly connected with the rotor 3202. Specifically, the intake port (3110) communicates with passages through the holes in input/output shaft, the passage then continues through a hallowing in the rotor's shaft (3210). This passage continues through the channel (3260) in the rigidly connected rotor, and in turn communicates periodically with a working chamber (3225). The exhaust porting is similarly constructed on the axially opposed end of the rotor and shafts, periodically enabling communication between the working (exhaust) chamber and the environment. Additional elements shown are exhaust channel 3261 in rotor 3202, exhaust channel 3211 in shaft 3210, and exhaust port (3112).

The various embodiments described above may be operated at a partial load, using conventional fuel modulation or fuel skip-cycle methods as described below. For example, to operate at part load, especially with heavy fuels like Diesel, JP8, etc., a number of options are available. For example, the amount of fuel provided to the engine may be modulated as in as in conventional engines.

Alternatively, the engine may be run in "digital mode"—by running every firing cycle at full load, but skipping a percentage of cycles. For example, skipping three out of each ten cycles would enable the engine to run under 70% of full power; skipping eight out of each ten cycles will enable the engine to run under 20% load, etc. The cycle skipping can be implemented simply by cutting off the fuel supply. In this case, the air compressed in a compression chamber will expand in an expansion chamber, even though no combustion occurred in the interim. This will not only occur with minimal loss in energy, as working medium (air, in this case) acts as an air spring, but some energy recovery is possible, as heat is transferred from the working chamber's walls to the air, thereby cooling the engine internally, while increasing the temperature and, therefore, pressure of the expanding gases, thereby some of the losses affiliated with cooling the engine may be partially recovered as useful work.

Figure 31:
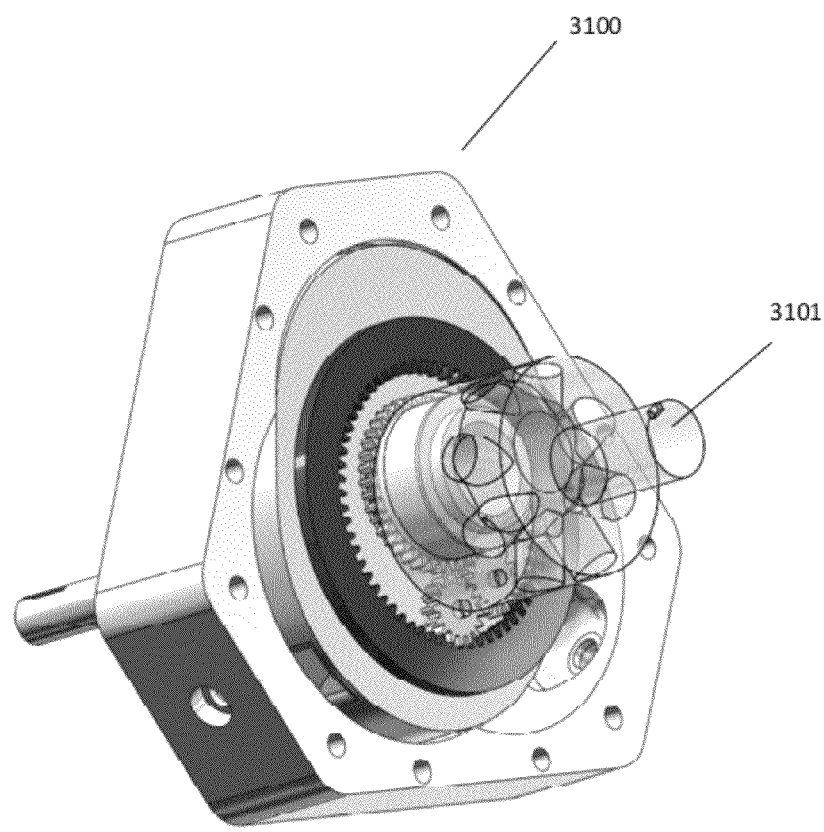
FIG. 31 schematically illustrates an embodiment of a rotor for a rotary engine.
Figures 32A, 32B, 32C, 32D, 32E, 32F:
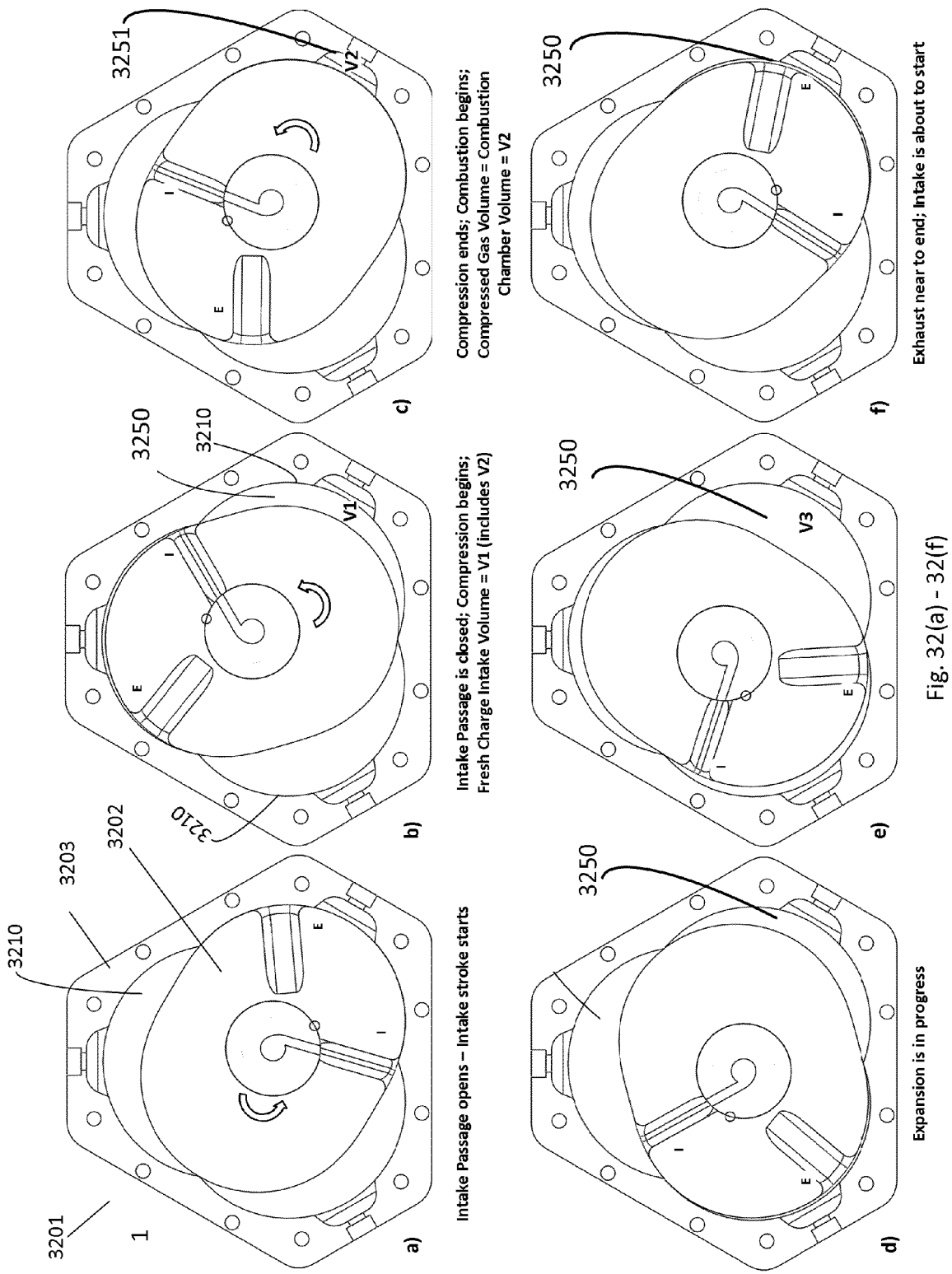
FIGS. 32(a)-32(f) schematically illustrate rotor positions during execution of an engine cycle.

FIG. 31 schematically illustrates an embodiment 3100 including an internal gear and pinion with ratio of 3:2 or, alternately of 2:1 if idler(s) are driven by the eccentric shaft 3101.

FIG. 32 schematically illustrates an embodiment configured to execute the high efficiency hybrid cycle ("HEHC").

In analogy with conventional piston engines the HEHC may be called 4-stroke cycles as they have 4 distinctive strokes: Intake, Compression, Combustion & Expansion, and Exhaust. A scavenging variant of the HEHC (HEHC-s) is equivalent to a 2-stroke engine cycle wherein, at the end of expansion, the cavity is scavenged by the blow-by ambient air, which removes combusted gasses and refills the cavity with a fresh air or an air/fuel mixture charge.

A HEHC pressure-volume diagram is shown in FIGS. 1 and 2 of U.S. published patent application US 20110023814 A1. In the initial state, only the air is compressed, like in Diesel cycle, during the compression stroke. Fuel may be added close to the end of compression stroke or just after the compression stroke. Since air is already compressed at this point to a relatively high pressure (~55 bar), high injection pressures, similar to those used in modern diesel engines are required to achieve full combustion and clean exhausts. The operation is akin to Diesel engines except for the fact that combustion occurs at the constant volume, as achieved in Otto cycle engines that are spark ignited. However, unlike spark ignition engines, the combustion occurs due to fuel injection into a very hot compressed air. Having said this, however, a spark plug may be used as well. Expansion occurs in this cycle to ambient pressures, similar to Atkinson cycle.

Partial load operation may be accomplished by fuel modulation, as in Diesel engines or by skipping some of the injections all together, as it will be described below.

Due to similarities of this cycle to Diesel, Otto and Atkinson, this cycle is referred to as a "Hybrid Cycle". It may also possible to inject water during combustion and/or expansion strokes as this may improve the efficiency of the engine, while providing for cooling from within the engine.

If leakage between moving components and housing is kept at low level, the maximum efficiency of this cycle is expected to be about 57%, while average efficiency is expected to be above 50%.

The embodiment 3201 schematically illustrated in FIGS. 32(*a*)-32(*f*) includes a rotor 3202 within a housing 3203. As the rotor 3202 rotates, it forms various working chambers with housing 3203 to execute an HEHC cycle.

The cycle begins with the start of the fresh air intake stroke, at which point the rotor 3202 is within lobe receiving region 3210, as schematically illustrated in FIG. 32(*a*). In this position, an intake conduit is open within the engine 3201, for example as illustrated in previous embodiments. At the point at which intake is complete, the air intake closes, and the air (which may be referred to as a working medium) is confined within the working chamber 3250, as schematically illustrated in FIG. 32(*b*). As the rotor continues to turn, the air within working chamber 3250 is compressed, in a compression phase of the HEHC cycle. As such, at this point in the cycle, the working chamber 3250 is a compression chamber. When the compression chamber is initially cut-off from the environment outside of the engine 3201, it has a volume V1.

As the rotor 3202 continues to turn, it eventually completely occupies the lobe-receiving region 3210, and the working medium is confined within a combustion chamber 3251, as schematically illustrated in FIG. 32(*c*). The combustion chamber 3251 has a volume V2, which is less than volume V1. At this point, the working medium includes both the compressed air and a fuel, and combustion begins. Combustion may be initiated by any means, but in this embodiment combustion is initiated by the degree of compression of the working medium.

The combustion increases the pressure of the working medium, which in turn exerts force on the rotor 3202, causing the rotor 3202 to continue its rotation, and thereby allowing the working medium to expand in an expansion phase of the HEHC cycle, as schematically illustrated in FIG. 32(*d*). The volume of the working chamber, and therefore the volume of the working medium, expands until the volume (V3) exceeds the intake volume V1, as schematically illustrated in FIG. 32(*e*).

Finally, the expansion phase ends, and the working medium is exhausted to the environment outside of the engine 3201, as schematically illustrated in FIG. 32(*f*).

Although the embodiments above have been described in terms of internal combustion engines, some embodiments may be used as an expander, such as in a steam engine, for example. Indeed, various embodiments may be configured as an external heat engine (e.g., an external combustion engine). For example, heat may be supplied into a working chamber by placing a heat pipe into the volume described above as a combustion chamber, to allow transfer of external heat from solar, combustion, nuclear, etc. into that chamber.

Indeed, the disclosure herein will support a broad variety of potential claims. For example, in embodiments with a wedge seal, and/or with a face seal on a chamfered edge of a rotor, pressure (such as gas pressure for example) will generate a radial force on the face seal, and that force will, in turn, bias the face seal to ride up the chamfered edge, thereby converting the force into axial movement of the seal by the chamfered edge of the rotor. Also, in some embodiments, a face seal may have an axial (flat) surface that could be a very short distance away from the surface of the cover. This creates a gap for gas to pass through and create pressure/force in opposite direction to the above mentioned axial force. The surface area of this gap controls the axial force—that often serves as an unwanted brake, thereby reducing friction between face seal and the cover.

If a surface of the peak seal has the same chamfer angle as the wedge seal—the small part of the peak seal could be designed to move together with the wedge seal, thus reducing or totally eliminating the gap between peak and wedge seal.

A variety of seals, such as face seals and peak, are described above, and or all of which could be claimed, either alone, or in the context of a seal grid.

In addition, embodiment of engines described herein may be operated in a variety of modes. For example, embodiments may be operated in a 2-stroke mode, or a variety of 4-stroke modes, including without limitation, executing an HEHC cycle (i.e., HEHC operation).

Some other potential claims are listed below.

P1. A rotary engine comprising:
a housing having a working cavity;
a shaft having an eccentric rotor integral with, or fixedly attached to, the shaft, the eccentric rotor disposed within the working cavity;
at least one hydrodynamic bearing supporting the shaft, so as to allow the eccentric rotor to rotate within the working cavity.

P2. A rotary engine comprising:
a housing having a working cavity;
a shaft, the shaft having an eccentric portion;
a rotor disposed on the eccentric portion and within the working cavity;
a hub comprising plurality of rotors;
a plate fixedly coupled to the shaft, the plate comprising a plurality of apertures, each of the plurality of rollers passing through a corresponding one of the plurality of apertures,
wherein the rotation of the rotor causes the rollers to circulate around the apertures, such that the eccentric motion of the rotor is transferred to circular motion in the plate.

P3. A rotary engine comprising:
a housing having a working cavity;
a sealing grid;
a rotor shaft having a rotor integral with, or fixedly attached to, the shaft, the rotor disposed within the working cavity; and
at least one input/output shaft disposed in the engine to as to eccentrically support the rotor shaft.

P4. The engine of potential claim P3, wherein the input/output shaft is configured to serve as a counterweight to dynamically balance the rotor.

P5. The engine of potential claim P3, the rotor shaft and the intake/output shaft further comprising intake and exhaust passages (e.g., A rotary engine having a gas exchange system comprising the intake and exhaust port and passages through the intake/output shaft and the rotor).

P6. The engine of potential claim P3, further comprising a hydrodynamic bearing supporting input/output shafts.

The embodiments of the invention described above are intended to be merely exemplary; numerous variations and modifications will be apparent to those skilled in the art. All such variations and modifications are intended to be within the scope of the present invention as defined in any appended claims. For example, any the various seals disclosed above may be used with any of the various rotors described herein. Similarly, any of the various intake and exhaust ports may be used with any of the rotors and/or shafts described herein.

What is claimed is:

1. An improved engine of the type including a cycloidal rotor having N lobes and a housing having a corresponding set of N+1 lobe-receiving regions for successively receiving the lobes as the rotor rotates about an axis relative to the housing, the housing having (i) a pair of sides axially disposed on first and second sides of the rotor, and (ii) a peak disposed between each pair of adjacent lobe-receiving regions, and (iii) an intake port and an exhaust port, wherein the improvement comprises:
a plurality of peak seals, at least one of the plurality of peak seals disposed on each peak and configured to maintain contact with the rotor throughout a period of rotation of the rotor, each peak seal being radially biased against the rotor throughout the rotation of the rotor, due to a cycloidal geometry of the rotor and the lobe-receiving portions;
a first passageway defined in the rotor to communicate cyclically between the intake port and a working chamber, the first passageway configured to allow air to enter from a radial face of the rotor into the working chamber, the working chamber defined as a volume lying between two peak seals, the housing and the rotor;
a second passageway, distinct from the first passageway, defined in the rotor to communicate cyclically between the exhaust port and the working chamber, the second passageway configured to allow exhaust gas to exit from the working chamber through the radial face of the rotor;
a first face seal, disposed between the first side of the housing and the rotor, configured to seal the working chamber; and
a second face seal, disposed between the second side of the housing and the rotor, configured to seal the working chamber;
wherein the first face seal is disposed near an outer edge of the rotor, the outer edge defined by an intersection of an axial face of the rotor with the radial face of the rotor,
wherein the passageways and the face seals are configured to cause each face seal to maintain contact with both the rotor and one of the sides of the housing through all angular positions of the rotor while avoiding communication with either of the ports.

2. The engine according to claim 1, wherein each peak seal has a contact region with the rotor, and the contact region is curved with a radius of curvature equal to a radius of curvature of a theoretical roller, which theoretical roller is uniquely defined by the geometry of the rotor and the geometry of the lobe-receiving regions.

3. The engine according to claim 1, wherein the second face seal is disposed near a second outer edge of the rotor, the second outer edge defined by an intersection of a second axial face of the rotor with the radial face of the rotor.

4. The engine according to claim 1, wherein the first face seal is disposed on the axial face of the rotor, and the axial face includes a landing at the outer edge, wherein the landing is between the outer edge and the first face seal, the engine further comprising a button seal disposed so as to contact the rotor and the first face seal at the landing.

5. The engine according to claim 1, wherein, at a first angle of the rotor within the housing, the working chamber forms a compression chamber having a maximum compression chamber volume, and at a second angle of the rotor within the housing, the working chamber forms an expansion chamber having a maximum expansion chamber volume, the maximum expansion chamber volume being at greater than or equal to 1.0 times the maximum compression chamber volume.

6. The engine according to claim 5, wherein the maximum expansion chamber volume is at least 3 times the maximum compression chamber volume.

7. The engine according to claim 1, further comprising a plurality of lubricant channels in at least one of the sides, each of the plurality of the lubricant channels disposed so as to deliver lubricant to a corresponding one of the plurality of peak seals.

8. The engine according to claim 1, further comprising a lubricant channel in at least one of the sides, the lubricant channel disposed so as to continuously deliver lubricant to a corresponding one of the face seals.

9. The engine according to claim 1, wherein the housing has a working cavity, and a combustion chamber in fluid communication with the working cavity, wherein the engine further comprises:

a piston disposed on the housing and configured to controllably enter into and withdraw from the combustion chamber;

the rotor rotatably mounted within the working cavity, so as to form a working chamber of variable volume with the housing, at different angles of rotation of the rotor within the working cavity; and a controller synchronized to the angle of rotation of the rotor to controllably cause the piston to enter into and withdraw from the combustion chamber, so as to cause the combined volume of the working chamber and the combustion chamber to be constant over a range of angles of rotation of the rotor.

10. The engine according to claim 1, wherein the housing has a working cavity, wherein the engine further comprises:

a shaft having an eccentric portion;

the rotor having a first axial face, and a second axial face opposite the first axial face, the rotor disposed on the eccentric portion and within the working cavity, the rotor comprising a first cam on the first axial face, the first cam having an eccentricity corresponding to the eccentricity of the eccentric portion of the shaft; and a cover integral with, or fixedly attached to, the housing, the cover comprising a plurality or rollers, each roller engaged with the cam, wherein the cam guides the rotation of the rotor as the rotor rotates within the working cavity and orbits around the shaft.

11. The improved engine of claim 10, further comprising a second cam on the second axial face of the rotor.

12. An improved engine of the type including a rotor having N lobes and a housing having a corresponding set of N+1 lobe-receiving regions for successively receiving the lobes as the rotor rotates about its axis and orbits about an axis relative to the housing, the housing having (i) a pair of sides axially disposed on first and second sides of the rotor, and (ii) a peak disposed between each pair of adjacent lobe-receiving regions, and (iii) an intake port and an exhaust port, wherein the improvement comprises:

a first passageway defined in the rotor to communicate cyclically between the intake port and a working chamber defined as a volume lying between two peak seals, the housing and the rotor, the first passageway configured to allow air to enter from a radial face of the rotor into the working chamber;

a second passageway, distinct from the first passageway, defined in the rotor to communicate cyclically between the exhaust port and the working chamber, the second passageway configured to allow exhaust gas to exit from the working chamber through the radial face of the rotor;

a sealing grid comprising a plurality of peak seals, at least one of the plurality of peak seals disposed on each peak and configured to maintain contact with the rotor, such peak seal being radially biased against the rotor; and a face seal, disposed on the rotor and configured to maintain contact with the sides of the housing and a chamfered portion of the rotor, and to seal the working chamber, such face seal being axially biased against the housing side;

wherein the face seal is disposed near an outer edge of the rotor, the outer edge defined by an intersection of an axial face of the rotor with the radial face of the rotor, wherein the ports, passageways and face seal are configured to cause the face seal to maintain contact with both the rotor and one of the sides of the housing through all angular positions of the rotor while avoiding the face seal crossing over either of the ports.

13. The engine according to claim 12, wherein the face seal is a wire seal.

14. The engine according to claim 12, wherein the rotor is of a cycloidal geometry defined by a set of N+1 theoretical rollers, and each peak seal has a contact region with the rotor, and the contact region is curved with a radius of curvature approximating a radius of curvature of the theoretical roller that the peak seal replaces.

15. An improved engine of the type including a rotor having N lobes and a housing having a corresponding set of N+1 lobe-receiving regions for successively receiving the lobes as the rotor rotates about its axis and orbits about an axis relative to the housing, the housing having (i) a pair of sides axially disposed on first and second sides of the rotor, and (ii) a peak disposed between each pair of adjacent lobe-receiving regions, and (iii) an intake port and an exhaust port, wherein the improvement comprises:

a first passageway defined in the rotor to communicate cyclically between the intake port and a working chamber defined as a volume lying between two peak seals, the housing and the rotor, the first passageway configured to allow air to enter from a radial face of the rotor into the working chamber;

a second passageway, distinct from the first passageway, defined in the rotor to communicate cyclically between the exhaust port and the working chamber, the second passageway configured to allow exhaust gas to exit from the working chamber through the radial face of the rotor;

a sealing grid comprising a plurality of peak seals, at least one of the plurality of peak seals disposed on each peak and configured to maintain contact with the rotor, such peak seal being radially biased against the rotor; and a face seal, disposed on the rotor and configured to maintain contact with the sides of the housing and to seal the working chamber, such face seal being axially biased against the housing side, where over the course of rotation the face seal does not cross over the intake or exhaust port, and 2×(N+1) button seals, one for each side of every peak, disposed within the housing side, axially biased toward the rotor and configured to maintain contact with the peak seal and the face seal, wherein the face seal is disposed near an outer edge of the rotor, the outer edge defined by an intersection of an axial face of the rotor with the radial face of the rotor, wherein the ports, passageways and face seal are configured to cause the face seal to maintain contact with both the rotor and one of the sides of the housing through all angular positions of the rotor while avoiding the face seal crossing over either of the ports.

16. The engine according to claim 15, wherein a profile of the face seal is generated as a cycloidal curve in which a radius of a theoretical roller used to generate the cycloidal curve is a radius of the button in the button seal.

17. The engine according to claim 15, wherein the rotor is of a cycloidal geometry defined by a set of N+1 theoretical rollers, and each peak seal has a contact region with the rotor, and the contact region is curved with a radius of curvature approximating a radius of curvature of the theoretical roller that the peak seal replaces.

\* \* \* \* \*